(12) United States Patent
Toroker et al.

(10) Patent No.: US 10,745,815 B2
(45) Date of Patent: Aug. 18, 2020

(54) NON-UNIFORM DOPING OF PHOTOELECTROCHEMICAL CELL ELECTRODES

(71) Applicant: Technion Research & Development Foundation Limited, Haifa (IL)

(72) Inventors: Maytal Caspary Toroker, Kiryat Haiim (IL); Ofer Neufeld, Haifa (IL); Natav Yatom, Kibbuz Sasa (IL)

(73) Assignee: TECHNION RESEARCH & DEVELOPMENT FOUNDATION LIMITED, Haifa (IL)

(*) Notice: Subject to any disclaimer, the term of this patent is extended or adjusted under 35 U.S.C. 154(b) by 469 days.

(21) Appl. No.: 14/987,837

(22) Filed: Jan. 5, 2016

(65) Prior Publication Data

US 2016/0194768 A1   Jul. 7, 2016

Related U.S. Application Data

(60) Provisional application No. 62/099,693, filed on Jan. 5, 2015.

(51) Int. Cl.
| | |
|---|---|
| C25B 9/00 | (2006.01) |
| C25D 7/12 | (2006.01) |
| C25D 17/00 | (2006.01) |
| C25B 11/04 | (2006.01) |
| C25B 1/04 | (2006.01) |
| C25B 9/06 | (2006.01) |

(Continued)

(52) U.S. Cl.
CPC .............. *C25B 11/04* (2013.01); *C25B 1/003* (2013.01); *C25B 1/04* (2013.01); *C25B 9/06* (2013.01); *H01G 9/2027* (2013.01); *Y02E 10/542* (2013.01); *Y02E 60/366* (2013.01); *Y02P 20/134* (2015.11); *Y02P 20/135* (2015.11)

(58) Field of Classification Search
CPC .. C25B 9/06; C25B 1/003; C25B 9/00; C25D 7/12; C25D 17/00
USPC ........................................................ 204/242
See application file for complete search history.

(56) References Cited

U.S. PATENT DOCUMENTS

| | | |
|---|---|---|
| 2006/0024928 A1 | 2/2006 | Seebauer |
| 2006/0267082 A1 | 11/2006 | Hofmann |
| 2008/0169019 A1 | 7/2008 | Korevaar |

(Continued)

OTHER PUBLICATIONS

Pauling and Hendricks (1925) the crystal structures of hematite and corundum. J Am Chem Soc 47(3): 781-790.

(Continued)

*Primary Examiner* — Zulmariam Mendez
(74) *Attorney, Agent, or Firm* — Roach, Brown, McCarthy & Gruber, P.C.; Kevin D. McCarthy

(57) ABSTRACT

The present invention provides a photo-electrochemical (PEC) cell electrode having a surface portion and a bulk portion composed of the same material, wherein at least one of the bulk portion and the surface portion of the electrode is doped with at least one dopant, and wherein said doping is non-uniform along an axis perpendicular to the surface portion. The non-uniform doping can include different concentrations and/or types of the dopants in the bulk portion and in the surface portion of the electrode. There is further provided a PEC cell comprising said electrode and an electrolyte, wherein the surface portion of the electrode faces the electrolyte.

20 Claims, 15 Drawing Sheets

(51) Int. Cl.
H01G 9/20 (2006.01)
C25B 1/00 (2006.01)

(56) References Cited

U.S. PATENT DOCUMENTS

2010/0015749 A1  1/2010  Borden
2012/0267234 A1  10/2012 Reece
2013/0008495 A1*  1/2013 Jun .................. C25B 1/003
                                            136/255

OTHER PUBLICATIONS

Perdew et al., (1996) Generalized Gradient Approximation Made Simple. Phys Rev Lett 77: 3865-3868.
Perdew et al., (1997) Generalized Gradient Approximation Made Simple. Phys Rev Lett 78: 1396.
Pozun and Henkelman (2011) Hybrid density functional theory band structure engineering in hematite. J Chem Phys 134: 224706.
Pu et al., (2014) Coupling Ti-doping and Oxygen Vacancies in Hematite Nanostructures for Solar Water Oxidation with High Efficiency. J Mater Chem A 2: 2491-2497.
Rahman and Joo (2013) Electrodeposited nanostructured α-Fe2O3 thin films for solar water splitting: Influence of Pt doping on photoelectrochemical performance. Materials Chemistry and Physics 140(1): 316-322.
Rollmann et al., (2004) First-principles calculation of the structure and magnetic phases of hematite. Phys Rev B 69: 165107.
Rossmeisl et al., (2007) Electrolysis of water on oxide surfaces. Journal of Electroanalytical Chemistry 607(1-2): 83-89.
Rosso et al., (2003) An Ab Initio Model of Electron Transport in Hematite (α-Fe2O3) Basal Planes. The Journal of Chemical Physics 118: 6455-6466.
Sanchez et al., (1986) Synthesis, bulk, and surface characterization of niobium-doped Fe2O3 single crystals. Journal Df Solid State Chemistry 61(1): 47-55.
Sanchez et al., (1988) The photoelectrochemistry of niobium doped α-Fe2O3. Journal of Electroanalytical Chemistry and Interfacial Electrochemistry 252(2): 269-290.
Sandratskii et al., (1996) Band theory for electronic and magnetic properties of α-Fe2O3. J Phys: Condens Matter 8: 983-989.
Searle and Dean (1970) Temperature and Field Dependence of the Weak Ferromagnetic Moment of Hematite. Physical Review B 1: 4337-4342.
Shannon (1976) Revised effective ionic radii and systematic studies of interatomic distances in halides and chalcogenides. Acta Crystallographica Section A 32(5): 751-767.
Shinde et al., (2011) Physical Properties of Hematite α-Fe2O3 Thin Films: Application to Photoelectrochemical Solar Cells. Journal of Semiconductors 32: 013001.
Shockley and Queisser (1961) Detailed Balance Limit of Efficiency of P-N. Junction Solar Cells. Journal of applied physics 32: 510-519.
Sivula et al., (2011) Solar water splitting: progress using hematite (α-Fe(2) O(3)) photoelectrodes. ChemSusChem 4 (4): 432-49.
Toroker (2014) Theoretical Insights into the Mechanism of Water Oxidation on Nonstoichiometric and Titanium-Doped Fe2O3(0001). The Journal of Physical Chemistry C 118(40): 23162-23167.
Toroker and Carter (2012) Hole Transport in Nonstoichiometric and Doped Wustite. The Journal of Physical Chemistry C 116: 17403-17413.
Toroker et al., (2011) First Principles Scheme to Evaluate Band Edge Positions in Potential Transition Metal Oxide Photocatalysts and Photoelectrodes. Physical Chemistry Chemical Physics 13: 16644-16654.
Turnock (1966) Fe—Nb Oxides: Phase Relations at 1180°C. Journal of the American Ceramic Society 49(4): 177-180.
Valdes et al., (2008) Oxidation and Photo-Oxidation of Water on TiO2 Surface. J Phys Chem C 112(26): 9872-9879.

Velev et al., (2005) Electronic and Magnetic Structure of Transition-Metal-Doped a-Hematite. Physical Review B 71: 205208.
Veziroglu and Barbir (1992) Hydrogen: The Wonder Fuel. International journal of hydrogen energy 17: 391-404.
Viñes et al., (2009) Carbon on Platinum Substrates: From Carbidic to Graphitic Phases on the (111) Surface and on Islanoparticles. J Phys Chem A 113(43): 11963-11973.
Wallace and Ward (1983) Hydrogen as a Fuel. International Journal of Hydrogen Energy 8: 255-268.
Wang et al., (2006) Oxidation energies of transition metal oxides within the GGA+U framework. Physical Review B 73 (19): 195107.
Wang et al., (2015) Synergetic Effect of Conjugated Ni(Oh)2/IrO2 Cocatalyst on Titanium-Doped Hematite Photoanode for Solar Water Splitting. The Journal of Physical Chemistry C 119 (34): 19607-19612.
Wang et al., (2015) Uniform Doping of Titanium in Hematite Nanorods for Efficient Photoelectrochemical Water Splitting. ACS Applied Materials & Interfaces 7(25): 14072-14078.
Xia et al., (2013) Tuning the band gap of hematite α-Fe2O3 by sulfur doping. Physics Letters A 377(31-33): 1943-1947.
Yang et al., (2013) A new hematite photoanode doping strategy for solar water splitting: oxygen vacancy generation. PCCP 15(6): 2117-2124.
Yang et al., (2013) Computational Modeling of Octahedral Iron Oxide Clusters: Hexaaquairon(III) and Its Dimers. J Phys Chem C 117(42): 21706-21717.
Yang et al., (2014) Multireference Ab Initio Study of Ligand Field d—d Transitions in Octahedral Transition-Metal Oxide Clusters. J Phys Chem C 118(50): 29196-29208.
Yatom and Toroker (2015) Hazardous Doping for Photo-Electrochemical Conversion: The Case of Nb-Doped Fe2O3 from First Principles. Molecules 20(11): 19900-19906.
Zandi and Hamann (2015) The potential versus current state of water splitting with hematite. PCCP 17(35): 22485-22503.
Zhang et al., (2014) Improvement of Hematite as Photocatalyst by Doping with Tantalum. J Phys Chem C 118(30): 16842-16850.
Zhou et al., (2004) First-principles prediction of redox potentials in transition-metal compounds with LDA+U. Physical Review B 70(23): 235121.
Zimmermann et al., (1999) Electronic Structure of 3d-Transition-Metal Oxides: On-Site Coulomb Repulsion Versus Covalency. Journal of Physics: Condensed Matter 11: 1657-1682.
Wen et al., Synthesis, Characterization, and Photocatalysis of Fe-Doped TiO2: A combined Experimental and Theoretical Study, 11 pages, International Journal of Photoenergy, vol. 2012, Article ID 368750.
Abdi et al., Efficient solar water splitting by enhanced charge separation in a bismuth vanadate-silicon tandem photoelectrode, published Jul. 29, 2013; 7 pages, Nature Communications.
Malviya et al., Systemic comparison of different dopants in thin film hematite (alpha-Fe2O3) photoanodes for solar water splitting, 9 pages, Journal of Materials Chemistry A, Dec. 9, 2015.
Neufeld et al., Platinum Doped alpha-Fe2O3 for Enhanced Water Splitting Efficiency: A DFT+U Study: The Journal of Physical Chemistry C 2015, 119, 5836-5847, 12 pages.
Yatom et al., Hazardous Doping for Photo-Electrochemical Conversion: the Case of Nb-Doped Fe2O3 from First Principles; 7 pages, Molecules 2015, 20, 19900-19906; doi: 10.3390/molecules201119668.
Abel et al., (2015) SILAR-Deposited Hematite Films for Photoelectrochemical Water Splitting: Effects of Sn, Ti, Thickness, and Nanostructuring. The Journal of Physical Chemistry C 119(9): 4454-4465.
Anisimov et al., (1997) First-principles calculations of the electronic structure and spectra of strongly correlated systems: the LDA+ U method. Journal of Physics: Condensed Matter 9: 767-808.
Annamalai et al., (2016) Fabrication of superior α-Fe2O3 nanorod photoanodes through ex-situ Sn-doping for solar water splitting. Solar Energy Materials & Solar Cells 144: 247-255.
Aroutiounian et al., (2006) Investigations of the structure of the iron oxide semiconductor—electrolyte interface. Comptes Rendus Chimie 9(2): 325-331.

(56) References Cited

OTHER PUBLICATIONS

Aroutiounian et al., (2006) Photoelectrochemistry of semiconductor electrodes made of solid solutions in the system $Fe_2O_3$—$Nb_2O_5$. Solar Energy 80(9): 1098-1111.

Bastien and Handler (2006) in Hydrogen Production from Renewable Energy Sources. EIC Climate Change Technology, 2006 IEEE, May 10-12, 2006; pp: 1-9.

Bengone et al., (2000) Implementation of the projector augmented-wave LDA+U method: Application to the electronic structure of NiO. Phys Rev B 62: 16392-16401.

Biöchl (1994) Projector augmented-wave method. Physical Review B 50: 17953-17979.

Biöchl et al., (1994) Improved tetrahedron method for Brillouin-zone integrations. Physical Review B 49: 16223-16233.

Chatman et al., (2015) Charge Transport at Ti-Doped Hematite (001)/Aqueous Interfaces. Chem Mater 27(5): 1665-1673.

Dianat et al., (2008) DFT study of the thermodynamic stability of Pd-Pt bulk oxide phases. J Phys Chem C 112 (35): 13623-13628.

Dudarev et al. (1998) Electron-energy-loss spectra and the structural stability of nickel oxide: An LSDA+U study. Phys Rev B 57: 1505-1509.

Engel and Tuller (2014) The electrical conductivity of thin film donor doped hematite: from insulator to semiconductor by defect modulation. Phys Chem Chem Phys 16: 11374-11380.

Fajin et al., (2014) Density Functional Theory Study of the Water Dissociation on Platinum Surfaces: General Trends. J Phys Chem A 118(31): 5832-5840.

Fernández et al., (2008) Scaling Relationships for Adsorption Energies on Transition Metal Oxide, Sulfide, and Nitride Surfaces. Angew Chem Int Ed 47: 4683-4686.

Finger and Hazen (1980) Crystal Structure and Isothermal Compression of $Fe_2O_3$, $Cr_2O_3$, and $V_2O_3$ to 50 Kbars. Journal of Applied Physics 51: 5362-5367.

Glasscock et al., (2007) Enhancement of Photoelectrochemical Hydrogen Production from Hematite Thin Films by the Introduction of Ti and Si. J Phys Chem C 111(44): 16477-16488.

Henkelman et al., (2006) A fast and robust algorithm for Bader decomposition of charge density. Computational Materials Science 36(3): 354-360.

Hsu et al., (2013) Effects of Platinum Doping on the Photoelectrochemical Properties of $Fe_2O_3$ Electrodes. Int J Electrochem Sci 8: 11615-11623.

Hu et al., (2008) Pt-Doped $\alpha$-$Fe_2O_3$ Thin Films Active for Photoelectrochemical Water Splitting. Chem Mater 20(12): 3803-3805.

Huda et al., (2010) Electronic, structural, and magnetic effects of 3d3d transition metals in hematite. J Appl Phys 107: 123712.

Ingler and Khan (2004) Photoresponse of spray pyrolytically synthesized magnesium-doped iron (III) oxide (p-$Fe_2O_3$) thin films under solar simulated light illumination. Thin Solid Films 461(2): 301-308.

Jorand Sartoretti et al., (2005) Photoelectrochemical oxidation of water at transparent ferric oxide film electrodes. J Phys Chem B 109(28): 13685-92.

Kanan et al., (2014) First-Principles Modeling of Electrochemical Water Oxidation on MnO: ZnO (001). ChemElectroChem 1: 407-415.

Kemppainen et al., (2015) Physical Modeling of Photoelectrochemical Hydrogen Production Devices. Journal of Physical Chemistry C 119(38): 21747-21766.

Kim et al., (2013) Single-crystalline, wormlike hematite photoanodes for efficient solar water splitting. Sci Rep 3: 2681.

Kleiman-Shwarsctein et al., (2008) Electrodeposition of $\alpha$-$Fe_2O_3$ Doped with Mo or Cr as Photoanodes for Photocatalytic Water Splitting. J Phys Chem C 112(40): 15900-15907.

Kleiman-Shwarsctein et al., (2010) Electrodeposited Aluminum-Doped $\alpha$-$Fe_2O_3$ Photoelectrodes: Experiment and Theory. Chem Mater 22(2): 510-517.

Kokalj and Causà (1999) Periodic density functional theory study of Pt(111): surface features of slabs of different thicknesses. Journal of Physics: Condensed Matter 11: 7463-7480.

Kresse and Furthmüller (1996) Efficiency of ab-initio total energy calculations for metals and semiconductors using a plane-wave basis set. Computational Materials Science 6(1): 15-50.

Kresse and Hafner (1993) Ab initio molecular dynamics for liquid metals. Phys Rev B 47: 558-561.

Kresse and Joubert (1999) From ultrasoft pseudopotentials to the projector augmented-wave method. Phys Rev B 59 1758-1775.

Kronawitter et al., (2014) Titanium incorporation into hematite photoelectrodes: theoretical considerations and experimental observations. Energy & Environmental Science 7(10): 3100-3121.

Lad and Henrich (1988) Structure of a-$Fe_2O_3$ single crystal surfaces following Ar+ ion bombardment and annealing in O2. Surface Science 193 (1-2): 81-93.

Lee and Han (2013) Thermodynamics of native point defects in [small alpha]-$Fe_2O_3$: an ab initio study. PCCP 15(43): 18906-18914.

Lehmann and Taut (1972) On the numerical calculation of the density of states and related properties. Phys Status Solidi b 54: 469-477.

Lehmann and Taut (1973) On the numerical calculation of the density of states and related properties. Physica Status Solidi (b) 57(2): 815 Addendum.

Liao et al., (2011) Electron Transport in Pure and Doped Hematite. Nano Letters 11: 1775-1781.

Liao et al., (2012) Water oxidation on pure and doped hematite (0001) surfaces: prediction of Co and Ni as effective lopants for electrocatalysis. J Am Chem Soc 134(32): 13296-309.

Ling et al., (2011) Sn-doped hematite nanostructures for photoelectrochemical water splitting. Nano Leff 11(5): 2119-25.

Liu et al., (2012) Photoelectrochemical properties of Ni-doped $Fe_2O_3$ thin films prepared by electrodeposition. Electrochimica Acta 59: 121-127.

Man et al., (2011) Universality in Oxygen Evolution Electrocatalysis on Oxide Surfaces. ChemCatChem 3(7): 1159-1165.

Mao et al., (2011) Controlled growth of vertically oriented hematite/Pt composite nanorod arrays: use for photoelectrochemical water splitting. Nanotechnology 22(17): 175703.

Momma and Izumi (2008) VESTA: a three-dimensional visualization system for electronic and structural analysis. Journal of Applied Crystallography 41(3): 653-658.

Monllor-Satoca et al., (2015) What Do you Do, Titanium? Insight into the Role of Titanium Oxide as Water Oxidation Promoter in Hematite-based Photoanodes. Energy Environ Sci 8: 3242-3254.

Morin (1950) Magnetic Susceptibility of $\alpha Fe_2O_3$ and $\alpha Fe_2O_3$ with Added Titanium. Phys Rev 78: 819-820.

Mosey et al., (2008) Rotationally invariant ab initio evaluation of Coulomb and exchange parameters for DFT+UDFT+U calculations. J Chem Phys 129: 014103.

Neufeld and Toroker (2015) Platinum-Doped $\alpha$-$Fe_2O_3$ for Enhanced Water Splitting Efficiency: A DFT+U Study. The Journal of Physical Chemistry C 119(11): 5836-5847.

Nguyen et al., (2014) Photo-driven oxidation of water on $\alpha$-$Fe_2O_3$ surfaces: An ab initio study. J Chem Phys 140: 064703.

Nørskov et al., (2004) Origin of the Overpotential for Oxygen Reduction at a Fuel-Cell Cathode. J Phys Chem B 108 (46):17886-17892.

* cited by examiner

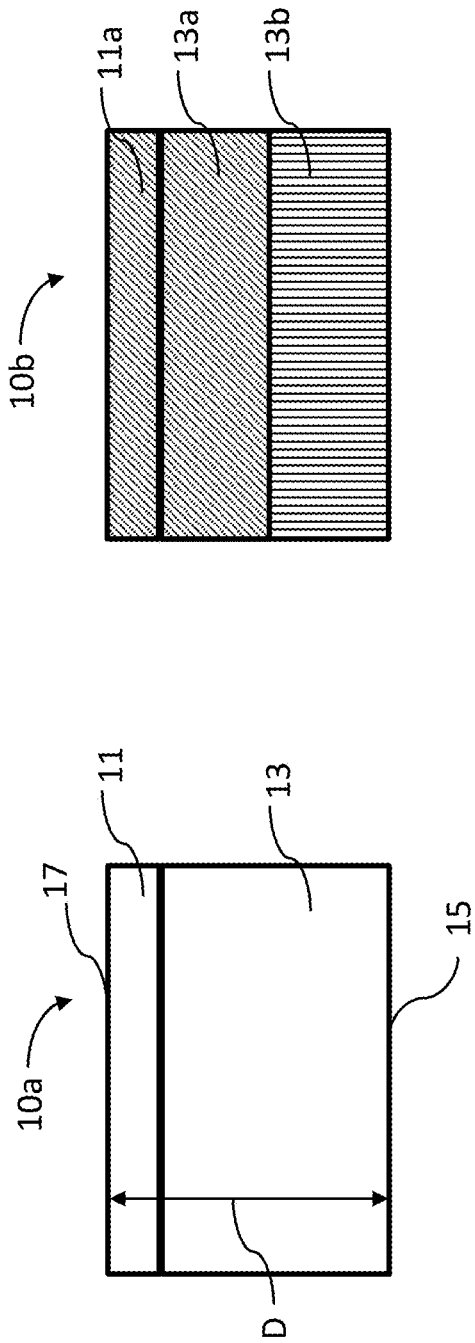
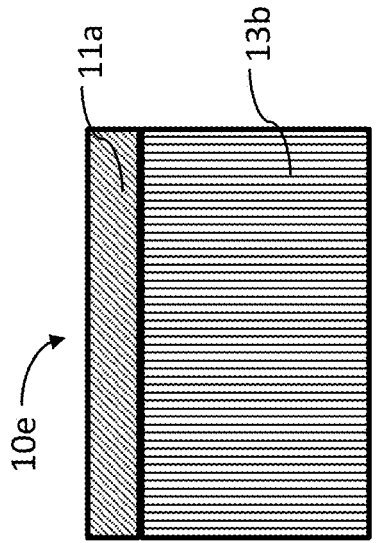
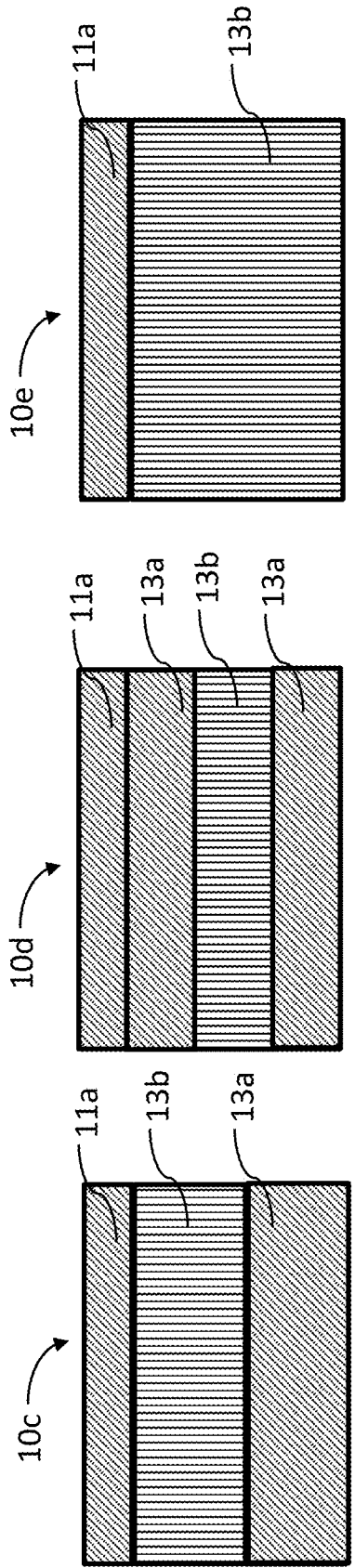
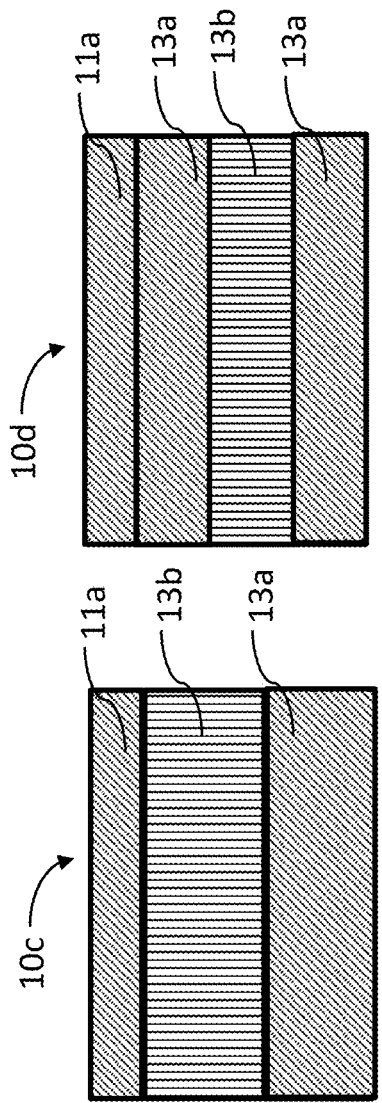
Figure 1A
Figure 1B
Figure 1C
Figure 1D
Figure 1E

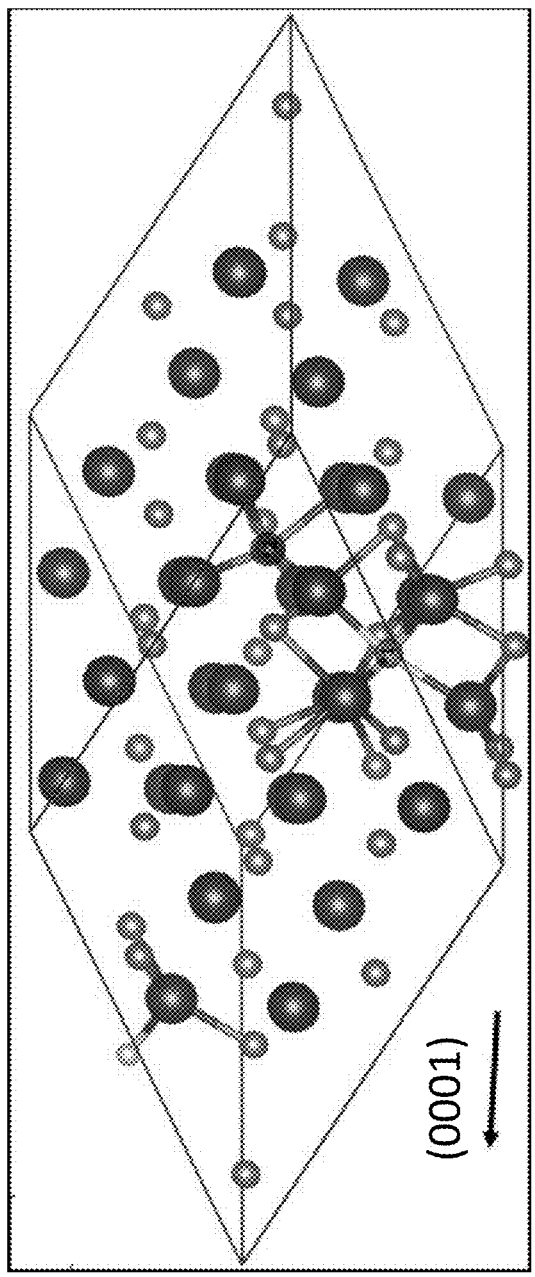
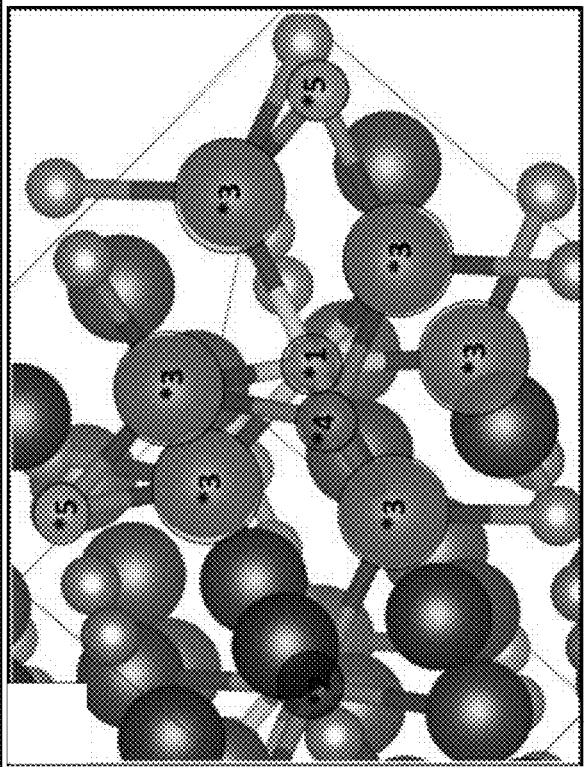
Figure 3A
Figure 3B

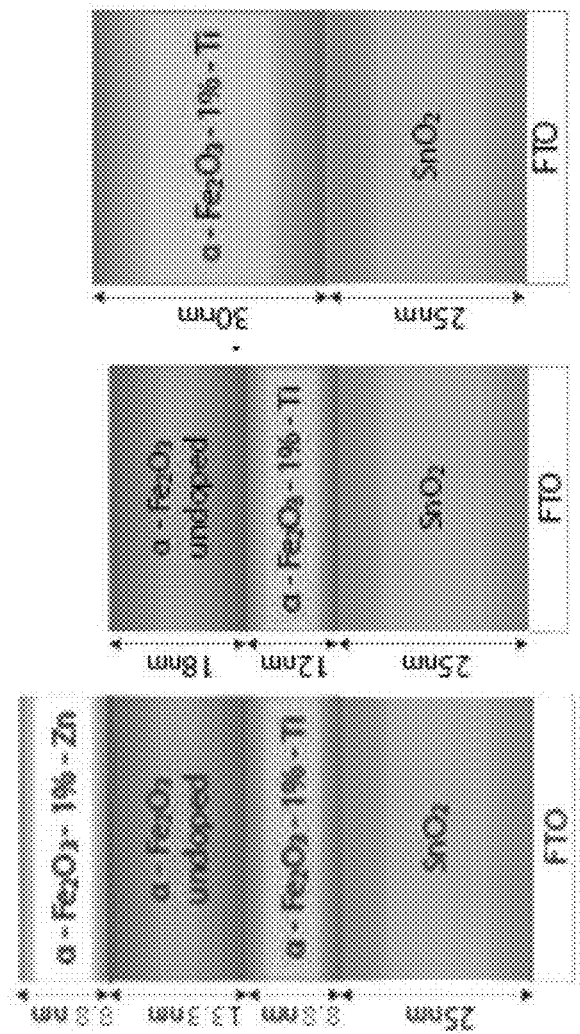
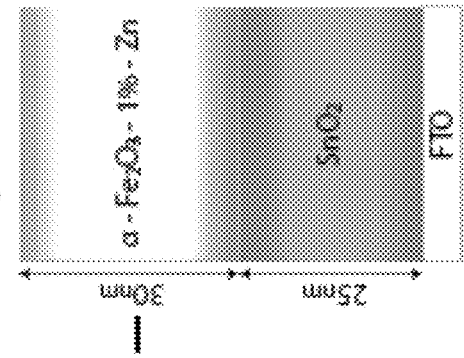
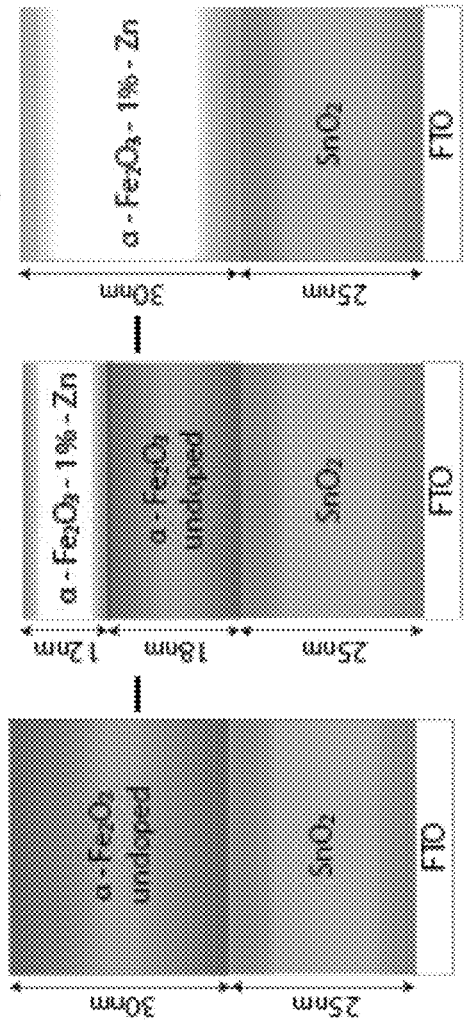
Figure 11A
Figure 11B
Figure 11C
Figure 11D
Figure 11E
Figure 11F

NON-UNIFORM DOPING OF PHOTOELECTROCHEMICAL CELL ELECTRODES

FIELD OF THE INVENTION

The present invention relates to electrodes for use in photoelectrochemical cells, wherein said electrodes have a non-uniform doping.

BACKGROUND OF THE INVENTION

A promising route in the search for renewable energy sources is using solar energy to split water into oxygen and hydrogen. This process is environmentally "clean", i.e., does not produce greenhouse gases. Other advantages include earth's large water reservoir and the high energy density of hydrogen fuel.

Solar energy conversion into hydrogen can be accomplished in a photoelectrochemical (PEC) cell, where solar energy is absorbed at the semiconductor photoanode and/or photocathode. In a PEC cell including a photoanode, as a result of absorbing photons, excited electrons transport through the circuit and arrive at the opposing cathode where they take part in the half-cell reaction of hydrogen reduction. Holes transport in the opposite direction toward the photoanode surface and complete the other half-cell reaction of water oxidation. Overall, this process splits water to produce hydrogen and oxygen gas.

Conversion efficiencies of PEC cells are limited by the intrinsic absorbing qualities of the electrode. The electrode should be a good conductor, a good solar light absorber, a good catalyst, and have an appropriate band edge alignment for water splitting. Furthermore, the electrode should be relatively inexpensive, abundant, nontoxic, and maintain stability in operating conditions. Most of said qualities can be found in hematite ($\alpha$-$Fe_2O_3$, also termed herein "$Fe_2O_3$"). Hematite has been widely studied for use in PEC cells [Engel, J.; Tuller, H. L., *Physical Chemistry Chemical Physics* 2014, 16, 11374-11380; Yang, Y.; Ratner, M. A.; Schatz, G. C., *The Journal of Physical Chemistry C* 2013, 117, 21706-21717; Yang, Y.; Ratner, M. A.; Schatz, G. C., *The Journal of Physical Chemistry C* 2014, 118, 29196-29208; Pu, A.; Deng, J.; Li, M.; Gao, J.; Zhang, H.; Hao, Y.; Zhong, J.; Sun, X., *Journal of Materials Chemistry A* 2014, 2, 2491-2497]. However, $Fe_2O_3$ also has disadvantages, including low charge mobility, high electron-hole recombination rate, and a large overpotential of 0.5-0.6V that is required for water oxidation [Sivula, K.; Le Formal, F.; Gratzel, M., *Chem Sus Chem* 2011, 4, 432-449].

The efficiency of a PEC cell containing $Fe_2O_3$ can be amplified through doping [Liao, P.; Keith, J. A.; Carter, E. A., *JACS* 2012, 134, 13296-13309; Huda, M. N.; Walsh, A.; Yan, Y.; Wei, S.-H.; Al-Jassim, M. M., *Journal of Applied Physics* 2010, 107, 123712-123712-6; Kleiman-Shwarsctein, A.; Huda, M. N.; Walsh, A.; Yan, Y.; Stucky, G. D.; Hu, Y.-S.; Al-Jassim, M. M.; McFarland, E. W., *Chemistry of Materials* 2009, 22, 510-517; Xia, C.; Jia, Y.; Tao, M.; Zhang, Q., *Physics Letters A* 2013, 377, 1943-1947; Pozun, Z. D.; Henkelman, G., *The Journal of chemical physics* 2011, 134, 224706]. In particular, measurements show a significant increase in efficiency and photo-current in platinum (Pt)-doped PEC cells [Hu, Y.-S.; Kleiman-Shwarsctein, A.; Forman, A. J.; Hazen, D.; Park, J.-N.; McFarland, E. W., *Chemistry of Materials* 2008, 20, 3803-3805; Mao, A.; Park, N.-G.; Han, G. Y.; Park, J. H., *Nanotechnology* 2011, 22, 175703; Hsu, Y.-P.; Lee, S.-W.; Chang, J.-K.; Tseng, C.-J.; Lee, K.-R.; Wang, C.-H., *Int. J. Electrochem. Sci* 2013, 8, 11615-11623; Kim, J. Y.; Magesh, G.; Youn, D. H.; Jang, J.-W.; Kubota, J.; Domen, K.; Lee, J. S., *Scientific reports* 2013, 3, 2681; Rahman, G.; Joo, O.-S., *Materials Chemistry and Physics* 2013, 140, 316-322]. In said measurements, Pt was found to increase electron conductivity and therefore was regarded as an n-type dopant. Pt also changes the electrode's morphology, causing smaller grain size, larger surface area, and a more uniform and dense $Fe_2O_3$ film, which are thought to aid in charge transport throughout the electrode. In fact, Jae Young Kim et al., using Pt-doped $Fe_2O_3$ with a single-crystalline "wormlike" morphology and a cobalt phosphate co-catalyst manufactured the world's highest record for a $Fe_2O_3$ PEC cell current density in 2013. All of said studies report an optimum in Pt-doping in the 0.1-4% at. range, yet no study has fully explained why this is the optimal range. In addition, no study has given a complete explanation to why Pt is a successful dopant.

Additional elements, including Si, Ti, Al, Nb, Sn, Cr, Mo, Ni, Mg, Zn, and Ta have been incorporated into $\alpha$-$Fe_2O_3$ as dopants to enhance the photoactivity of hematite [Glasscock, J. A.; Barnes, P. R. F.; Plumb, I. C.; Savvides, N., *J. Phys. Chem. C* 2007, 111, 16477-16488; Jorand Sartoretti, C.; Alexander, B. D.; Solarska, R.; Rutkowska, I. A.; Augustynski, J.; Cerny, R., *J. Phys. Chem. B* 2005, 109, 13685-13692; Kleiman-Shwarsctein, A.; Huda, M. N.; Walsh, A.; Yan, Y.; Stucky, G. D.; Hu, Y.-S.; Al-Jassim, M. M.; McFarland, E. W., *Chem. Mater.* 2009, 22, 510-517; Sanchez, C.; Sieber, K. D.; Somorjai, G. A., *J. Electroanal. Chem. Interfacial Electrochem.* 1988, 252, 269-290; Ling, Y.; Wang, G.; Wheeler, D. A.; Zhang, J. Z.; Li, Y. *Nano Lett.* 2011, 11, 2119-2125; Kleiman-Shwarsctein, A.; Hu, Y. S.; Forman, A. J.; Stucky, G. D.; McFarland, E. W., *J. Phys. Chem. C* 2008, 112, 15900-15907; Liu, Y.; Yu, Y. X.; Zhang, W. D., *Electrochim. Acta* 2012, 59, 121-127; Ingler, W. B., Jr.; Khan, S. U. M., *Thin Solid Films* 2004, 461, 301-308; X. Zhang, H. Li, S. Wang, F.-R. F. Fan, and A. J. Bard, *J. Phys. Chem. C,* 2014, 118 (30), pp 16842-16850].

To the inventors' best knowledge, the doping of the PEC cell electrodes is typically homogeneous, wherein the bulk and the surface of the electrode include similar concentration of the dopant. Since non-uniform photoanodes can significantly lower the photocurrent and the overall device performance, it is important to produce uniform and reproducible doped hematite photoanodes to ensure better device performance [A. Annamalai et al., Solar Energy Materials & Solar Cells 144 (2016) 247-255].

There still exists an unmet need for improved PEC cell electrodes, inter alia, hematite-based electrodes, which would provide enhanced conversion efficiency without significantly increasing the cost or compromising stability of the currently available Pt-doped $Fe_2O_3$ material.

SUMMARY OF THE INVENTION

The present invention provides photoelectrochemical (PEC) cell electrodes doped with at least one dopant in a non-uniform manner. The non-uniform doping of the electrodes provides increased photoactivity and catalytic activity in the water splitting reaction. The present invention is based in part on a surprising finding that dopants, which increase conductivity and light absorbance of the hematite-based electrodes, have a negative effect on the chemical reactivity thereof. In particular, it has been found that platinum, while enhancing the electron conductivity of $Fe_2O_3$ in the bulk of the electrode, increases the overpotential for water oxidation, when present near the surface of the electrode. The inventors have further investigated the effect of doping of the $Fe_2O_3$ electrode with niobium and found an even more pronounced negative effect on the overpotential. This is in contrast to the previous studies, which showed the improvement of the water splitting reaction efficiency upon doping with Nb. The inventors of the present invention have further discovered that the overpotential for water oxidation on $Fe_2O_3$ depends on the dopant atom type and that the oxidation state of the dopant has a critical role on the overpotential.

Based on the theoretical calculations, the inventors suggested that in order to counteract the losses in surface chemistry yet exploit the gains that arise from the bulk doped properties a gradient doping approach of the electrode should be employed. For example, the $Fe_2O_3$ photoanode can be doped with the ideal percentage of Pt in the bulk, while drastically lowering the Pt concentration towards the surface. This way Pt can still aid in the absorption of solar light and transport of charged carriers to the reaction sites, without interfering with water oxidation. The inventors have further proposed to dope the PEC cell electrodes with different types of dopants, wherein the concentration of the first dopant is higher in the bulk of the electrode and of the second dopant on the surface. In particular, it has been suggested to use n-type dopants for doping the bulk of the electrode and p-type dopants for doping the surface of the electrode composed of an n-type material. For example, a hematite electrode can be doped with Pt in the bulk and a different dopant near the surface, such as nickel or cobalt which improves the catalytic activity of $Fe_2O_3$. For electrodes composed of a p-type material, an opposite scheme was suggested—doping of the bulk with a p-type dopant and of the surface with an n-type dopant.

The theoretical calculations of the inventors were supported by experimental results. Various non-uniformly doped electrodes were fabricated, wherein the concentration and/or type of the dopant on the surface was different than the concentration thereof in the bulk. In particular, one type of the non-uniformly doped electrode was a hematite (n-type material) electrode doped with Ti (n-type dopant) in the bulk and undoped on the surface. Another type was a hematite electrode doped with Ti in the bulk and with Zn (p-type dopant) on the surface. Photocurrents of the non-uniform electrodes were measured, revealing that said non-uniform doping increased the photocurrent and decreased the overpotential of the water oxidation reaction as compared to the hematite electrode uniformly doped with Ti.

Thus, according to one aspect, the present invention provides a photo-electrochemical (PEC) cell electrode having a bulk portion and a surface portion, wherein the electrode is doped with at least one dopant, and wherein said doping is non-uniform along an axis perpendicular to the surface portion.

In some embodiments, at least one of the bulk portion and the surface portion of the electrode is doped with the at least one dopant. In the currently preferred embodiments, the bulk portion and the surface portion are composed of the same material.

In some embodiments, the doping is non-uniform throughout the thickness of the electrode. The non-uniform doping can include different concentrations of the dopant, different types of the dopant or a combination thereof. Each possibility represents a separate embodiment of the invention.

In some embodiments, the surface portion of the electrode is in contact with the bulk portion. In further embodiments, the electrode is a one-piece slab, which consists essentially of the surface portion and the bulk portion.

In some embodiments, the surface portion is configured to face an electrolyte in the PEC cell. In further embodiments, the surface portion is a part of the electrode, on which the oxidation reaction takes place. In other embodiments, the surface portion is a part of the electrode, on which the reduction reaction takes place.

In further embodiments, the bulk portion is configured to contact a substrate of the PEC cell.

In some embodiments, the surface portion constitutes from about 0.05% to about 35% of the electrode thickness. In some embodiments, the bulk portion constitutes from about 65% to about 99.95% of the electrode thickness.

In alternative embodiments, the surface portion comprises from about 1 to about 100 monolayers of the material from which the electrode is composed.

In certain embodiments, the surface portion is a surface area of the electrode.

The electrode material can comprise an n-type material or a p-type material. The at least one dopant can comprise an n-type dopant or a p-type dopant. Each possibility represents a separate embodiment of the invention. In some embodiments, the electrode is doped with at least two dopants, including a first dopant and a second dopant. In further embodiments, the first dopant is an n-type dopant and the second dopant is a p-type dopant.

In various embodiments, the electrode material is selected from the group consisting of $\alpha$-$Fe_2O_3$, $TiO_2$, NiOOH, $NiO_2$, $SrTiO$, $BaTiO$, GaN, GaAs, MoS, WSe, MoSe, ZnO, $WO_3$, Si, $Cu_2O$, GaP, $GaInP_2$, CuGaSe, 3C—SiC, and a-SiC. Each possibility represents a separate embodiment of the invention. In certain embodiments, the electrode is composed of $\alpha$-$Fe_2O_3$. In various embodiments, the at least one dopant is selected from the group consisting of Pt, Ti, Zn, Nb, Ni, Co, Mn, Cu, Si, Sr, La, Al, Sn, Cr, Mo, Mg, Ta, and Fe. In certain embodiments, at least one dopant is selected from the group consisting of Pt, Ti, Zn, and Nb. Each possibility represents a separate embodiment of the invention.

According to some embodiments, the bulk portion and the surface portion are doped with the at least one dopant, and the concentration of the at least one dopant in at least a fraction of the bulk portion is different than the concentration of the at least one dopant in the surface portion. In further embodiments, the difference in the concentration of the at least one dopant in at least a fraction of the bulk portion and in the surface portion is above about 50%. In yet further embodiments, the concentration of the at least one dopant in at least a fraction of the bulk portion is higher than the concentration of the at least one dopant in the surface portion. In still further embodiments, the electrode material is an n-type material and the at least one dopant is an n-type dopant or the electrode material is a p-type material and the at least one dopant is a p-type dopant and the concentration of the at least dopant in at least a fraction of the bulk portion is higher than the concentration of the at least one dopant in the surface portion. Each possibility represents a separate embodiment of the invention. In yet further embodiments, the concentration of the at least one dopant in at least a fraction of the bulk portion decreases in a gradient towards the surface portion.

According to some embodiments, the bulk portion and the surface portion are doped with the at least one dopant, and the concentration of the at least one dopant in the bulk portion is different than the concentration of the at least one dopant in the surface portion. In further embodiments, the difference in the concentration of the at least one dopant in the bulk portion and in the surface portion is above about 50%. In yet further embodiments, the concentration of the at least one dopant in at least a fraction of the bulk portion is higher than the concentration of the at least one dopant in the surface portion. In still further embodiments, the electrode material is an n-type material and the at least one dopant is an n-type dopant or the electrode material is a p-type material and the at least one dopant is a p-type dopant and the concentration of the at least one dopant in the bulk portion is higher than the concentration of the at least one dopant in the surface portion. Each possibility represents a separate embodiment of the invention. In still further embodiments, the concentration of the at least one dopant in the bulk portion decreases in a gradient towards the surface portion.

In some embodiments, at least a fraction of the bulk portion is doped with the at least one dopant and the surface portion is not doped. In further embodiments, the electrode material is an n-type material and the at least one dopant is an n-type dopant or the electrode material is a p-type material and the at least one dopant is a p-type dopant. Each possibility represents a separate embodiment of the invention. In still further embodiments, the concentration of the at least one dopant in at least a fraction of the bulk portion decreases in a gradient towards the surface portion.

In some embodiments, the bulk portion is doped with the at least one dopant and the surface portion is not doped. In further embodiments, the electrode material is an n-type material and the at least one dopant is an n-type dopant or the electrode material is a p-type material and the at least one dopant is a p-type dopant. Each possibility represents a separate embodiment of the invention. In still further embodiments, the concentration of the at least one dopant in the bulk portion decreases in a gradient towards the surface portion.

In some embodiments, the surface portion is doped with the at least one dopant and the bulk portion is not doped. In further embodiments, the electrode material is an n-type material and the at least one dopant is a p-type dopant. In other embodiments, the electrode material is a p-type material and the at least one dopant is an n-type dopant.

In some embodiments, the electrode is doped with at least two dopants, including a first dopant and a second dopant. In further embodiments, at least a fraction of the bulk portion is doped with a first dopant and the surface portion is doped with a second dopant. In some embodiments, the electrode material is an n-type material, the first dopant is an n-type dopant and the second dopant is a p-type dopant. In other embodiments, the electrode material is a p-type material, the first dopant is a p-type dopant and the second dopant is an n-type dopant. In further embodiments, the concentration of the first dopant decreases in a gradient towards the surface portion and the concentration of the second dopant decreases in a gradient towards the bulk portion of the electrode.

In one particular embodiment, the electrode is composed of $\alpha$-$Fe_2O_3$, the bulk portion is doped with Pt and the surface portion is not doped. In another particular embodiment, the electrode is composed of $\alpha$-$Fe_2O_3$, the bulk portion is doped with Pt and the surface portion is doped with Ni or Co. Each possibility represents a separate embodiment of the invention.

In some exemplary embodiments, the electrode is composed of $\alpha$-$Fe_2O_3$, at least a fraction of the bulk portion is doped with Ti and the surface portion is doped with Zn. In further embodiments, the electrode is composed of $\alpha$-$Fe_2O_3$, the bulk portion is doped with Ti and the surface portion is doped with Zn.

In further exemplary embodiments, the electrode is composed of $\alpha$-$Fe_2O_3$, at least a fraction of the bulk portion is doped with Ti and the surface portion is not doped. In further embodiments, the electrode is composed of $\alpha$-$Fe_2O_3$, the bulk portion is doped with Ti and the surface portion is not doped.

In some embodiments, the electrode according to the principles of the present invention is an anode or photoanode. In other embodiments, the electrode is a cathode or photocathode. Each possibility represents a separate embodiment of the invention.

In another aspect, there is provided a photo-electrochemical (PEC) cell comprising the electrode according to the principles of the present invention. In further embodiments, the PEC cell comprises an electrolyte. In still further embodiments, the surface portion of the electrode faces the electrolyte.

In some embodiments, the PEC cell further comprises a cathode and an electrolyte. In other embodiments, the PEC cell comprises an anode and an electrolyte. In additional embodiments, the PEC cell includes two electrodes according to the principles of the present invention, one of which is a photoanode and the second one is a photocathode.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1A-1E: A schematic representation of the cross-sections of the electrodes: (1A-1E) comprising a bulk portion and a surface portion, wherein: (1B-1D) at least a fraction of the bulk portion has a concentration of the dopant which is different than the concentration of the dopant in the surface portion and (1E), wherein the concentration of the dopant in the bulk portion is different than the concentration of the dopant in the surface portion.

FIGS. 3A-3B: Structure of relaxed 1.25% at doped lattice: (3A) the structure of the relaxed lattice and (3B) magnification around the dopant. Bonds are only displayed between the Pt-dopant surrounding atoms and their nearest neighbors. Highlighted and numbered in the figure are different symmetry sites in the doped lattice. Numbered 1-5 are respectively: The $Pt^{+2}$ $O_h$ site, $Fe^{+2}$ $C_{4v}$ site with occupied electron, O $C_{3v}$ sites with delocalized holes, $Fe^{+3}$ $C_{3v}$ and $C_{2v}$ site (nearest Fe atoms to Pt). The $Fe^{+3}$ $C_{3v}$ and $C_{2v}$ atoms are first nearest irons to Pt (distance 2.8 [Å]) and $Fe^{+2}$ $C_{4v}$ are second nearest to Pt (distance 3.6 [Å]). Bader charges of atoms in sites 1, 2 and 3 respectively are: +1.47e, +1.41e, and −1.05e. Created using VESTA visualizing software.

FIGS. 11A-11F: Doping profiles of the undoped, uniformly and non-uniformly doped $Fe_2O_3$ electrodes: (11A) Ti doped-undoped-Zn doped electrode, (11B) Ti doped-undoped electrode, (11C) Ti doped electrode, (11D) undoped electrode, (11E) undoped-Zn doped electrode, and (11F) Zn-doped electrode.

DETAILED DESCRIPTION OF THE INVENTION

Figure 1F:
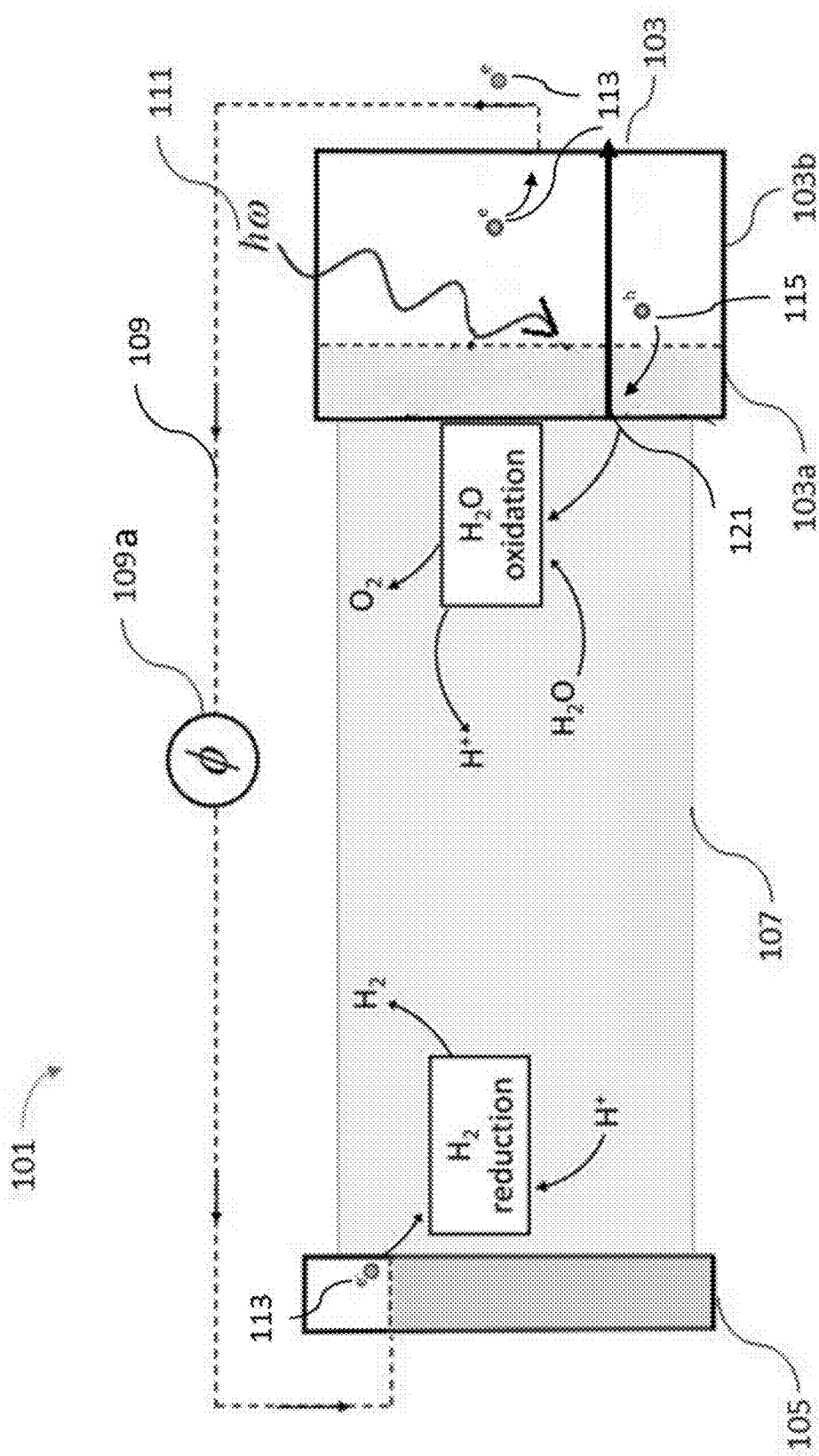
FIG. 1F: A schematic diagram of photoelectrochemical water splitting with a $Fe_2O_3$ photoanode performing water oxidation reaction and a cathode performing hydrogen reduction reaction.

The present invention provides photoelectrochemical (PEC) cell electrodes doped with at least one dopant in a non-uniform manner. The non-uniform doping of the electrodes provides increased photoactivity and catalytic activity in the water splitting reaction. The non-uniformity of the doping can be expressed in the variance in the concentration and/or type of the dopant throughout the electrode thickness (perpendicular to the electrode surface). In particular, the non-uniformity of doping can be expressed in the variance in the concentration of the at least one dopant between the bulk of the electrode and the surface thereof.

The present invention is based in part on a surprising finding that dopants, which increase conductivity of the hematite-based electrodes, have a negative effect on chemical reactivity thereof. In particular, it has been found that platinum, while enhancing the electron conductivity of $\alpha$-$Fe_2O_3$ in the bulk of the electrode, increases an overpotential for water reduction, when present near and/or on the surface of the electrode. Doping with Pt could be useful for improving electron conductivity of $Fe_2O_3$, since Pt donates an electron that resides on Fe (located next-nearest to Pt and has $C_{4v}$ symmetry). It was found that electrons could transport between equivalent Fe atoms that are equally distant from the dopants and that Pt reduces the energy gap by 0.15 [eV] which should improve solar light absorption and PEC efficiency. However, calculations of water adsorption and oxidation over a surface slab revealed that Pt has a negative effect on chemical reactivity. As a result of Pt donating an excess electron, the protonated surface is neutrally charged and stable, and therefore the energy required to adsorb another water molecule requires a significant amount of free energy. Hence, the overpotential enhances upon doping with Pt near the surface.

The inventors have further investigated the effect of doping of the $\alpha$-$Fe_2O_3$ electrode with niobium and found an even more pronounced negative effect on the overpotential. This is in contrast to the previous studies, which showed the improvement of the water splitting reaction efficiency upon doping with Nb [Sanchez, C.; Sieber, K. D.; Somorjai, G. A., J. Electroanal. Chem. Interfacial Electrochem. 1988, 252, 269-290; Aroutiounian, V. M.; Arakelyan, V. M.; Shahnazaryan, G. E.; Stepanyan, G. M.; Khachaturyan, E. A.; Turner, J. A. C. R. Chim. 2006, 9, 325-331]. Without wishing to being bound by theory or mechanism of action, it is contemplated that the reported improvement upon doping with Nb originates from band gap, band edge positions and electronic conductivity. The hazardous effect of increasing the overpotential for water reduction, which was found by the inventors of the present invention, can be explained in terms of surface charging. The inventors have found that overcharging the surface at the beginning of the water reduction reaction via Nb-doping causes at least two steps of the reaction to be thermodynamically spontaneous, such that the free energies are not distributed evenly throughout the reaction intermediates and therefore the overpotential is extremely large.

The inventors of the present invention have further discovered that the overpotential for water oxidation on $Fe_2O_3$ depends on the dopant atom type and that the oxidation state of the dopant has a critical role on the overpotential. Fe in the $Fe_2O_3$ electrode has an oxidation state of +3. Accordingly, the Nb dopant, which has an oxidation state of +5 is an n-type dopant in the $Fe_2O_3$ electrode (Nb donates two electrons that are located on two iron atoms). Pt has an oxidation state of +4 and donates half of the charge donated by Nb. In contrast, Ni has an oxidation state of +2 and is a p-type dopant in the $Fe_2O_3$ electrode. Using the modeling of water oxidation on Nb-doped $Fe_2O_3$ (0001) the inventors have shown that the overpotential for Nb dopant was significantly higher than for pure $Fe_2O_3$ or for $Fe_2O_3$ doped with elements that have a smaller oxidation state than Nb (+5).

Based on the theoretical calculations, the inventors suggested that in order to counteract the losses in surface chemistry yet exploit the gains that arise from the bulk doped properties a gradient doping approach should be used. For example, the bulk of the $Fe_2O_3$ photoanode can be doped with the required amount of Pt, as known in the art, while the Pt concentration should be drastically lowered towards the surface. In such electrode configuration Pt can aid in the absorption of solar light and transport of charged carriers to the reaction sites, without interfering with the water oxidation reaction. The inventors have further proposed to dope the PEC cell electrodes with different types of dopants, wherein the concentration of the first dopant is higher in the bulk of the electrode and the concentration of the second dopant is higher on the surface. In particular, it has been suggested to use n-type dopants for doping the bulk of the electrode and p-type dopants for doping the surface of the electrode composed of a material, which has a natural tendency to be an n-type material. For example, the bulk of the $Fe_2O_3$ electrode (which is naturally an n-type material) can be doped with Pt (which is an n-type dopant in the hematite electrode) and a different dopant, such as, but not limited to, Ni or Co, can be used for doping the electrode near and/or on its surface. Ni and Co are p-type dopants in $Fe_2O_3$, having lower overpotentials for water oxidation, and thereby improving the catalytic activity of $Fe_2O_3$. For electrodes composed of a p-type material, an opposite scheme can be used—doping of the bulk with a p-type dopant and of the surface with an n-type dopant.

The theoretical calculations of the inventors and the suggested gradient doping approach have been supported by the experimental results. Various non-uniformly doped electrodes were fabricated, wherein the concentration and/or type of the dopant on the surface was different than the concentration thereof in the bulk. In particular, one type of the non-uniformly doped electrode was a $Fe_2O_3$ electrode doped with Ti (n-type dopant in $Fe_2O_3$) in the bulk, wherein the surface portion of the electrode was not doped with a dopant. Another type was a hematite electrode doped with Ti in a fraction of the bulk portion and with Zn (p-type dopant in $Fe_2O_3$) in the surface portion. Photocurrents of the non-uniform electrodes were measured, revealing that said gradient doping increased the photocurrent and decreased the overpotential of the water oxidation reaction as compared to the hematite electrode uniformly doped with Ti throughout the whole thickness thereof.

Thus, according to one aspect, the present invention provides a photo-electrochemical (PEC) cell electrode having a bulk portion and a surface portion, wherein the electrode is doped with at least one dopant, and wherein said doping is non-uniform along an axis perpendicular to the surface portion. In some embodiments, at least one of the bulk portion and the surface portion of the electrode is doped with the at least one dopant.

The term "axis", as used herein, refers in some embodiments, to a plurality of axes in the electrode, wherein said plurality of axes is perpendicular to the surface portion. In other embodiments, the term "axis" refers to a direction, wherein said direction is perpendicular to the surface portion of the electrode. In other embodiments, the term "axis" refers to a direction, wherein said direction is perpendicular to the surface portion of the electrode. In further embodiments, the term "axis" refers to a plane or a plurality of planes, wherein said planes are perpendicular to the surface portion of the electrode.

The PEC cell electrode can be of any shape, as known in the art. Typically, the electrode is a thin film having a rectangular geometry. In certain embodiments, the electrode has a spherical or nanostructured geometry.

The electrode can include a first side and a second side, being opposite to the first side. In some embodiments, the first side constitutes a part of the bulk portion and the second side constitutes a part of the surface portion of the electrode. The term "perpendicular to the surface portion", as used in some embodiments, refers to the axis being perpendicular to the second side of the electrode. In further embodiments, the term refers to an axis being perpendicular to a surface area of the electrode.

The electrode thickness can be expressed as a distance between the first side and the second side of the electrode. Accordingly, in some embodiments, the doping is non-uniform throughout the electrode thickness.

In some embodiments, the surface portion of the electrode is in contact with the bulk portion. In further embodiments, the bulk portion and the surface portion are parallel to each other. In further embodiments, the electrode is a one-piece slab, including a bulk portion and a surface portion. In some embodiments, the electrode consists essentially of the surface portion and the bulk portion. FIG. 1A schematically represents a cross-section of electrode 10, including surface portion 11 and bulk portion 13. Electrode 10 further includes first side 15 and second side 17. First side 15 constitutes a part of bulk portion 13 and second side 17 constitutes a part of surface portion 11. Electrode 10 has thickness D, which can be represented by the distance between first side 15 and second side 17 of the electrode. In some embodiments, first side 15 is configured to face a substrate (not shown) of electrode 10 in the PEC cell and second side 17 is configured to face an electrolyte (not shown) in the PEC cell. When the electrode is doped, the doping is non-uniform throughout thickness D or along an axis or direction perpendicular to surface portion 11.

In some embodiments, the surface portion is configured to face an electrolyte in the PEC cell. In further embodiments, the surface portion is a part of the electrode, on which the water splitting reaction takes place. In further embodiments, the surface portion is a part of the electrode, on which the water oxidation reaction takes place. In additional embodiments, the surface portion is a part of the electrode, on which the hydrogen reduction reaction takes place.

In further embodiments, the bulk portion is configured to contact the substrate of the PEC cell electrode. The substrate can be composed of any suitable material, as known in the art, including, but not limited to tin oxide, silicon oxide, glass, indium tin oxide (ITO), alumina, or a metallic back-contact, such as platinum. In other embodiments, the electrode further includes a substrate. In certain such embodiments, the bulk portion contacts the substrate.

The electrode thickness can range from about 0.5 nm to about 1 cm.

In some embodiments, the surface portion constitutes at least about 0.05% of the electrode thickness. In further embodiments, the surface portion constitutes at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, or at least about 5% of the electrode thickness. Each possibility represents a separate embodiment of the invention.

In some embodiments, the surface portion constitutes from about 0.05% to about 35% of the electrode thickness. In further embodiments, the surface portion constitutes from about 0.05% to about 30% of the electrode thickness, from about 0.05% to about 25%, from about 0.05% to about 20%, from about 0.05% to about 15%, from about 0.05% to about 10%, from about 0.05% to about 5%, from about 0.05% to about 4%, from about 0.05% to about 3%, from about 0.05% to about 2%, from about 0.05% to about 1%, or from about 0.05% to about 0.5% of the electrode thickness. Each possibility represents a separate embodiment of the invention.

In some embodiments, the bulk portion constitutes from about 65% to about 99.95% of the electrode thickness. In some embodiments, the bulk portion constitutes from about 70% to about 99.95% of the electrode thickness, from about 75% to about 99.95%, from about 80% to about 99.95%, from about 85% to about 99.95%, from about 90% to about 99.95%, from about 95% to about 99.95%, from about 96% to about 99.95%, from about 97% to about 99.95%, from about 98% to about 99.95%, from about 99% to about 99.95%, or from about 99.5% to about 99.95% of the electrode thickness. Each possibility represents a separate embodiment of the invention.

In alternative embodiments, the surface portion comprises from about 1 to about 100 monolayers of the material from which the electrode is composed. In further embodiments, the surface portion comprises from about 1 to about 90 monolayers of the material from which the electrode is composed, from about 1 to about 80 monolayers, from about 1 to about 70 monolayers, from about 1 to about 60 monolayers, from about 1 to about 50 monolayers, from about 1 to about 40 monolayers, from about 1 to about 30 monolayers, from about 1 to about 20 monolayers, from about 1 to about 10 monolayers, from about 1 to about 5 monolayers of the material from which the electrode is composed. Each possibility represents a separate embodiment of the invention.

In some embodiments, the surface portion constitutes from about 0.1 nm to about 25 nm. In further embodiments, the surface portion constitutes from about 0.25 nm to about 20 nm, from about 0.5 nm to about 10 nm, or from about 1 nm to about 5 nm. In some embodiments, the bulk portion constitutes from about 1 nm to about 1 cm. In further embodiments, the bulk portion constitutes from about 5 nm to about 50 mm, from about 10 nm to about 10 mm, from about 50 nm to about 500 µm, or from about 100 nm to about 500 µm. Each possibility represents a separate embodiment of the invention.

In the currently preferred embodiments, the bulk portion and the surface portion are composed of the same material. The electrode material in the PEC cell is typically a semiconductor material.

The electrode material suitable for use in the electrodes of the present invention includes, inter alia, α-$Fe_2O_3$, $TiO_2$, SrTiO, BaTiO, GaN, GaAs, MoS, WSe, MoSe, ZnO, $WO_3$, Si, $Cu_2O$, GaP, $GaInP_2$, CuGaSe, 3C—SiC, a-SiC, NiOxHy, NiOOH, $NiO_2$, $BiFeO_3$, $Co_3O_4$, BiVO4, $CuWO_4$ and combinations thereof. Each possibility represents a separate embodiment of the invention. In certain embodiments, the electrode is composed of α-$Fe_2O_3$.

The electrode material, including the bulk portion and/or the surface portion, can comprise or be composed of an n-type material or a p-type material. Each possibility represents a separate embodiment of the invention. The term "n-type material", as used herein, refers in some embodiments, to a material having excess electron charge carriers as a result of, for example, natural or intentional occurrence of vacancies. The term "n-type material" refers in other embodiments to a material having electron energy levels near the top of the band gap so that they can be easily excited into the conduction band. The n-type material can be a material having a natural tendency to be an n-type material or a material, which electrical properties are altered, for example, by doping, to become an n-type material. Each possibility represents a separate embodiment of the invention. The non-limiting examples of the n-type material suitable for use in the electrodes of the present invention include $Fe_2O_3$, $TiO_2$, SrTiO, BaTiO, GaN, GaAs, MoS, WSe, MoSe, ZnO, and $WO_3$.

The term "p-type material", as used herein, refers in some embodiments, to material having extra holes in the crystal, which allows the mobility of holes in the valence band. The p-type material can be a material having a natural tendency to be a p-type material or a material, which electrical properties are intentionally altered, for example, by doping or fabricating vacancies, to become a p-type material. Each possibility represents a separate embodiment of the invention. The non-limiting examples of the p-type material suitable for use in the electrodes of the present invention include Si, $Cu_2O$, GaP, $GaInP_2$, CuGaSe, 3C—SiC, and a-SiC.

The term "doping", as used herein, refers to intentionally introduced impurities into the electrode material and/or vacancy doping. Accordingly, the at least one dopant can be selected from an impurity, such as, for example, an extrinsic atom, a vacancy or a crystal defect. Each possibility represents a separate embodiment of the invention.

The at least one dopant suitable for use in the electrodes of the present invention can include any element in the periodic table, and specifically metals or transition metals, such as, but not limited to, Pt, Ti, Zn, Nb, Ni, Co, Si, Al, Sn, Cr, Mo, Mg, Ta, Fe, Si, P, Mn, Cr, Cu, Sr, La, Al, Ga, In, H, Ir, Au, Ag, Pd, and Zr. In certain embodiments, the at least one dopant is selected from the group consisting of Pt, Ti, Zn, Ni, Co, and Nb. Each possibility represents a separate embodiment of the invention. In certain such embodiments, the dopant is an extrinsic atom.

The concentration of the at least one dopant can range from about 0.05% at. to about 15% at. of the total composition of the electrode. In some embodiments, the concentration ranges from about 0.1% at. to about 10% at., or from about 0.1% at. to about 5% at. In further embodiments, the concentration ranges from about 0.5% at. to about 4% at., from about 0.5% at. to about 3% at., or from about 0.5% at. to about 2% at. of the total composition of the electrode.

The concentration of the at least one dopant can range from about 0.05% at. to about 15% at. of the total composition of the bulk portion. In some embodiments, the concentration ranges from about 0.1% at. to about 10% at., or from about 0.1% at. to about 5% at. In further embodiments, the concentration ranges from about 0.5% at. to about 4% at., from about 0.5% at. to about 3% at., or from about 0.5% at. to about 2% at. of the total composition of the bulk portion. In yet further embodiments, the concentration of the at least one dopant ranges from about 1% at. to about 15% at. of the total composition of the bulk portion, from about 2% at. to about 15%, from about 3% at. to about 15%, from about 4% at. to about 15%, or from about 5% at. to about 15% at. In still further embodiments, the concentration of the at least one dopant ranges from about 0.05% at. to about 1% at. of the total composition of the bulk portion, from about 0.05% at. to about 0.75%, from about 0.05% at. to about 0.5%, from about 0.05% at. to about 0.25%, or from about 0.05% at. to about 0.1%. Each possibility represents a separate embodiment of the invention. In some embodiments, the bulk portion does not include the at least one dopant.

The concentration of the at least one dopant can range from about 0.05% at. to about 15% at. of the total composition of the surface portion. In some embodiments, the concentration ranges from about 0.1% at. to about 10% at., or from about 0.1% at. to about 5% at. In further embodiments, the concentration ranges from about 0.5% at. to about 4% at., from about 0.5% at. to about 3% at., or from about 0.5% at. to about 2% at. of the total composition of the surface portion. In still further embodiments, the concentration of the at least one dopant ranges from about 0.05% at. to about 1% at. of the total composition of the surface portion, from about 0.05% at. to about 0.75%, from about 0.05% at. to about 0.5%, from about 0.05% at. to about 0.25%, or from about 0.05% at. to about 0.1%. In yet further embodiments, the concentration of the at least one dopant ranges from about 1% at. to about 15% at. of the total composition of the surface portion, from about 2% at. to about 15%, from about 3% at. to about 15%, from about 4% at. to about 15%, or from about 5% at. to about 15%. In some embodiments, the surface portion does not include the at least one dopant.

The at least one dopant can include two different types of dopants, including a first dopant and a second dopant. In further embodiments, the at least one dopant includes three, four, five, six or more types of different dopants. Each possibility represents a separate embodiment of the invention.

The at least one dopant can comprise an n-type dopant or a p-type dopant. Each possibility represents a separate embodiment of the invention. The term "n-type dopant", as used herein, refers in some embodiments to a dopant, which donates electrons to the electrode material. In some embodiments, the term, "n-type dopant" refers to a material, which has a higher oxidation state than the electrode material. For example, when the electrode material is $Fe_2O_3$, having the oxidation state of +3, the n-type dopant can comprise any material having an oxidation state of +4 or +5, such as, but not limited to Pt, Ti, or Nb. In additional embodiments, the term, "n-type dopant" refers to a vacancy, which generates excess electrons. For example, in $Fe_2O_3$ oxygen vacancies generate excess electrons. "The term "p-type dopant", as used herein, refers in some embodiments to a dopant, which donates holes to the electrode material. In some embodiments, the term, "p-type dopant" refers to a material, which has a higher oxidation state than the electrode material. For example, when the electrode material is $Fe_2O_3$, having the oxidation state of +3, the p-type dopant can comprise any material having an oxidation state of +1 or +2, such as, but not limited to Zn, Ni or Co. In additional embodiments, the term, "p-type dopant" refers to a vacancy, which generates excess holes. For example, in $Fe_2O_3$ iron vacancies generate excess holes.

In some embodiments, the electrode is doped with at least two dopants, including a first dopant and a second dopant. In further embodiments, the first dopant is an n-type dopant and the second dopant is a p-type dopant.

The PEC cell electrode according to the principles of the present invention is particularly efficient in the water photoelectrochemical splitting reaction. Water photoelectrochemical splitting reaction is presented by Formula 1 below.

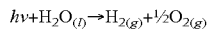  Formula 1

Without wishing to being bound by theory or mechanism of action the high efficiency of the electrodes of the present invention can be attributed to the non-uniform doping thereof with the at least one dopant. In particular, it is contemplated that the difference in the concentration of said dopant in the bulk and on the surface of the electrode is responsible for increasing the efficiency of the water photoelectrochemical splitting reaction. Additionally, the invention provides electrodes comprising at least two different dopants, wherein the concentration of each of the dopants is different in the bulk and on the electrode surface, thereby further improving the electrode efficiency.

In some embodiments the non-uniform doping of the electrode of the present invention is tailored in order to increase the conductivity and the light absorption of the electrode material without compromising the catalytic activity thereof in the water splitting reaction. In further embodiments the non-uniform doping of the electrode is tailored in order to increase the conductivity, the light absorption and the catalytic activity thereof in the water splitting reaction. The water splitting reaction can include water oxidation reaction and/or hydrogen reduction reaction.

The term "non-uniform doping", as used herein, refers in some embodiments, to a difference in the concentration of the at least one dopant along an axis perpendicular to the surface portion. The difference in the concentration can be gradual. For example, the concentration of the at least one dopant can change along an axis perpendicular to the surface portion as a function of the dopant position along said axis and the thickness of the electrode. The concentration of the at least one dopant can be about 100% at the first side of the electrode and about 0% at the second side of the electrode, decreasing in a gradient between said two sides. In some embodiments, the first side constitutes a part of the bulk portion and the second side constitutes a part of the surface portion of the electrode. In further embodiments, the concentration decreases between about 100% at the first side of the electrode and about 10% at the second side of the electrode, between about 100% and about 20%, between about 100% and about 30%, between about 100% and about 40%, between about 100% and about 50%, between about 100% and about 60%, between about 100% and about 70%, between about 100% and about 80%, or between about 100% and about 90%. Alternatively, the concentration of the at least one dopant can be about 0% at the first side of the electrode and about 100% at the second side of the electrode, decreasing in a gradient between said two sides. In additional embodiments, the concentration decreases between about 100% at the second side of the electrode and about 10% at the first side of the electrode, between about 100% and about 20%, between about 100% and about 30%, between about 100% and about 40%, between about 100% and about 50%, between about 100% and about 60%, between about 100% and about 70%, between about 100% and about 80%, or between about 100% and about 90%. Each possibility represents a separate embodiment of the invention. In certain such embodiments, percentage of the concentration refers to the ratio of the concentration of the dopant at a particular point of the electrode and the maximal concentration of the dopant in said electrode.

The difference in the concentration can be discreet. In certain embodiments, the term "non-uniform doping" refers to the difference in the concentration of the at least one dopant in at least a fraction of the bulk portion and in the surface portion of the electrode. The difference in the concentration can include above about 10% difference between at least a fraction of the bulk portion and the surface portion, above about 20% difference, above about 30% difference, above about 40% difference, above about 50% difference, above about 60% difference, above about 70% difference, above about 80% difference, above about 90% difference, or about 100% difference. Each possibility represents a separate embodiment of the invention. The difference in the concentration can be calculated according to Formula 2a, hereinbelow:

$$\frac{C_b - C_s}{C_b} \cdot 100\% \qquad \text{Formula 2a}$$

wherein $C_b$ is a concentration of the at least one dopant in at least a fraction of the bulk portion and $C_s$ is a concentration of the at least one dopant in the surface portion.

The term "at least a fraction of the bulk portion", as used herein, refers to a slice of the bulk portion, which is parallel to the surface portion and which can constitute from about 20% to about 99% of the bulk portion thickness. In further embodiments, at least a fraction of the bulk portion constitutes from about 30% to about 99% of the bulk portion thickness, from about 40% to about 99%, from about 50% to about 99%, from about 60% to about 99%, from about 70% to about 99%, from about 80% to about 99%, or from about 90% to about 99% of the bulk portion thickness. Each possibility represents a separate embodiment of the invention. Said fraction of the bulk portion can be positioned next to the surface portion or next to the substrate. In other embodiments, said fraction is not positioned next to the surface portion or next to the substrate. FIGS. 1B-1D represent cross-sections of electrodes 10b, 10c and 10d, respectively, comprising surface portion 11a doped with the at least one dopant, bulk portion 13a and 13b doped with the at least one dopant, wherein the concentration of the at least one dopant in fraction of the bulk portion 13b is different than the concentration of the at least one dopant in surface portion 11a. Fraction of the bulk portion 13b in FIGS. 1B-1D is a slice of the bulk portion positioned in different parts of the bulk portion, including next to the surface portion or next to the substrate (substrate not shown).

According to some embodiments, at least a fraction of the bulk portion and the surface portion are doped with the at least one dopant, and the concentration of the at least one dopant in the at least a fraction of the bulk portion is different than the concentration of the at least one dopant in the surface portion. In further embodiments, the difference in the concentration of the at least one dopant in at least a fraction of the bulk portion and in the surface portion is above about 10%, above about 20%, above about 30%, above about 40%, above about 50%, above about 60%, above about 70%, above about 80%, or above about 90%. Each possibility represents a separate embodiment of the invention. In various embodiments, the concentration of the at least one dopant in at least a fraction of the bulk portion is higher than the concentration of the at least one dopant in the surface portion. In other embodiments, the concentration of the at least one dopant in at least a fraction of the bulk portion is lower than the concentration of the at least one dopant in the surface portion.

In further embodiments, the electrode material is an n-type material and the at least one dopant is an n-type dopant and the concentration of the dopant in at least a fraction of the bulk portion is higher than the concentration of the dopant in the surface portion. The concentration can be higher by at least about 10%, at least about 20%, at least about 30%, at least about 40%, at least about 50%, at least about 60%, at least about 70%, at least about 80%, or at least about 90%. Each possibility represents a separate embodiment of the invention. In yet further embodiments, the concentration of the at least one dopant in at least a fraction of the bulk portion decreases in a gradient towards the surface portion.

In additional embodiments, the electrode material is a p-type material and the at least one dopant is a p-type dopant and the concentration of the dopant in at least a fraction of the bulk portion is higher than the concentration of the dopant in the surface portion. The concentration can be higher by at least about 10%, at least about 20%, at least about 30%, at least about 40%, at least about 50%, at least about 60%, at least about 70%, at least about 80%, or at least about 90%. Each possibility represents a separate embodiment of the invention. In yet further embodiments, the concentration of the at least one dopant in at least a fraction of the bulk portion decreases in a gradient towards the surface portion.

In other embodiments, the electrode material is an n-type material and the at least one dopant is an p-type dopant, or the electrode material is a p-type material and the at least one dopant is an n-type dopant; and the concentration of the dopant in at least a fraction of the bulk portion is lower than the concentration of the dopant in the surface portion. Each possibility represents a separate embodiment of the invention. The concentration can be lower by at least about 10%, at least about 20%, at least about 30%, at least about 40%, at least about 50%, at least about 60%, at least about 70%, at least about 80%, or at least about 90%. Each possibility represents a separate embodiment of the invention. In yet further embodiments, the concentration of the at least one dopant in at least a fraction of the bulk portion increases in a gradient towards the surface portion.

In some embodiments, at least a fraction of the bulk portion is doped with the at least one dopant and the surface portion is not doped. In further embodiments, the electrode material is an n-type material and the at least one dopant is an n-type dopant. In yet further embodiments, the electrode material is a p-type material and the at least one dopant is a p-type dopant. In still further embodiments, the concentration of the at least one dopant in at least a fraction of the bulk portion decreases in a gradient towards the surface portion.

In further embodiments, the term "non-uniform doping" refers to the difference in the concentration of the at least one dopant in the bulk portion and in the surface portion of the electrode. The difference in the concentration can include above about 10% difference between the bulk portion and the surface portion, above about 20% difference, above about 30% difference, above about 40% difference, above about 50% difference, above about 60% difference, above about 70% difference, above about 80% difference, above about 90% difference, or about 100% difference. Each possibility represents a separate embodiment of the invention. The difference in the concentration can be calculated according to Formula 2b, hereinbelow:

$$\frac{C_b - C_s}{C_b} \cdot 100\% \qquad \text{Formula 2b}$$

wherein $C_b$ is a concentration of the at least one dopant in the bulk portion and $C_s$ is a concentration of the at least one dopant in the surface portion.

For example, the concentration of the dopant in the bulk portion can be 1% at. and in the surface portion 0.5% at. In certain such embodiments, the difference in the concentration is 50%. In some embodiments, the concentration of the dopant in the bulk portion is 1% at. and in the surface portion 0.1% at. In certain such embodiments, the difference in the concentration is 90%. In particular embodiments, the concentration of the dopant in the bulk portion is 1% at. and in the surface portion 0% at. In certain such embodiments, the difference in the concentration is 100%.

FIG. 1E schematically represents the electrode comprising surface portion 11a and bulk portion 13a doped with the at least one dopant, wherein the concentration of the at least one dopant in bulk portion 13a is different than the concentration of the at least one dopant in surface portion 11a.

According to some embodiments, the bulk portion and the surface portion are doped with the at least one dopant, and the concentration of the at least one dopant in the bulk portion is different than the concentration of the at least one dopant in the surface portion. In further embodiments, the difference in the concentration of the at least one dopant in the bulk portion and in the surface portion is above about 10%, above about 20%, above about 30%, above about 40%, above about 50%, above about 60%, above about 70%, above about 80%, or above about 90%. Each possibility represents a separate embodiment of the invention.

In further embodiments, the electrode material is an n-type material and the at least one dopant is an n-type dopant and the concentration of the dopant in the bulk portion is higher than the concentration of the dopant in the surface portion. The concentration can be higher by at least about 10%, at least about 20%, at least about 30%, at least about 40%, at least about 50%, at least about 60%, at least about 70%, at least about 80%, or at least about 90%. Each possibility represents a separate embodiment of the invention. In yet further embodiments, the concentration of the at least one dopant in the bulk portion decreases in a gradient towards the surface portion.

In additional embodiments, the electrode material is a p-type material and the at least one dopant is a p-type dopant and the concentration of the dopant in the bulk portion is higher than the concentration of the dopant in the surface portion. The concentration can be higher by at least about 10%, at least about 20%, at least about 30%, at least about 40%, at least about 50%, at least about 60%, at least about 70%, at least about 80%, or at least about 90%. Each possibility represents a separate embodiment of the invention. In yet further embodiments, the concentration of the at least one dopant in the bulk portion decreases in a gradient towards the surface portion.

In other embodiments, the electrode material is an n-type material and the at least one dopant is a p-type dopant, or the electrode material is a p-type material and the at least one dopant is an n-type dopant; and the concentration of the dopant in the bulk portion is lower than the concentration of the dopant in the surface portion. Each possibility represents a separate embodiment of the invention. The concentration can be lower by at least about 10%, at least about 20%, at least about 30%, at least about 40%, at least about 50%, at least about 60%, at least about 70%, at least about 80%, or at least about 90%. Each possibility represents a separate embodiment of the invention. In yet further embodiments, the concentration of the at least one dopant in the bulk portion increases in a gradient towards the surface portion.

In some embodiments, the bulk portion is doped with the at least one dopant and the surface portion is not doped. In further embodiments, the electrode material is an n-type material and the at least one dopant is an n-type dopant. In yet further embodiments, the electrode material is p-type material and the at least one dopant is a p-type dopant. In still further embodiments, the concentration of the at least one dopant in the bulk portion decreases in a gradient towards the surface portion.

In some embodiments, the surface portion is doped with the at least one dopant and the bulk portion is not doped. In further embodiments, the electrode material is an n-type material and the at least one dopant is a p-type dopant. In other embodiments, the electrode material is a p-type material and the at least one dopant is an n-type dopant.

The term "non-uniform doping" refers in additional embodiments to a difference in the type of the at least one dopant along an axis perpendicular to the surface portion. The electrode can include two or more different types of dopants, which are non-uniformly distributed along an axis perpendicular to the surface portion. For example, the first side of the electrode can include a higher concentration of the first dopant and the second side of the electrode can include a higher concentration of the second dopant. The change in the concentrations of the first dopant and the second dopant along an axis perpendicular to the surface portion can be gradual. The concentration of the first dopant can be about 100% at the first side of the electrode and about 0% at the second side of the electrode and the concentration of the second dopant can be about 0% at the first side of the electrode and about 100% at the second side of the electrode, wherein the concentrations of the first and of the second dopants decrease in a gradient between said two sides. In some embodiments, the first side constitutes a part of the bulk portion and the second side constitutes a part of the surface portion of the electrode. In further embodiments, the concentration of the first dopant decreases between about 90% at the first side of the electrode and about 10% at the second side of the electrode and the concentration of the second dopant increases between about 10% at the first side of the electrode and about 90% at the second side of the electrode. In still further embodiments, the concentration of the first dopant decreases between about 80% at the first side of the electrode and about 20% at the second side of the electrode and the concentration of the second dopant increases between about 20% at the first side of the electrode and about 80% at the second side of the electrode. In yet further embodiments, the concentration of the first dopant decreases between about 70% at the first side of the electrode and about 30% at the second side of the electrode and the concentration of the second dopant increases between about 30% at the first side of the electrode and about 70% at the second side of the electrode. In certain such embodiments, percentage of the concentration refers to the ratio of the concentration of first or the second dopant at a particular point of the electrode and the maximal concentration of the combination of the first and the second dopants in said electrode.

In some embodiments, the electrode is doped with at least two dopants, including a first dopant and a second dopant.

In some embodiments, at least a fraction of the bulk portion is doped with a first dopant and the surface portion is doped with a second dopant. In some embodiments, the electrode material is an n-type material, the first dopant is an n-type dopant and the second dopant is a p-type dopant. In other embodiments, the electrode material is a p-type material, the first dopant is a p-type dopant and the second dopant is an n-type dopant. In further embodiments, the concentration of the first dopant decreases in a gradient towards the surface portion and the concentration of the second dopant decreases in a gradient towards the bulk portion. The concentration of the first dopant in the bulk portion and of the second dopant in the surface portion can be same or different. Each possibility represents a separate embodiment of the invention. In some embodiments, at least a fraction the bulk portion is not doped with a second dopant and the surface portion is not doped with a first dopant. In other embodiments, the surface portion is further doped with a first dopant, having a lower concentration than in at least a fraction of the bulk portion.

In some embodiments, the bulk portion is doped with a first dopant and the surface portion is doped with a second dopant. In some embodiments, the electrode material is an n-type material, the first dopant is an n-type dopant and the second dopant is a p-type dopant. In other embodiments, the electrode material is a p-type material, the first dopant is a p-type dopant and the second dopant is an n-type dopant. In further embodiments, the concentration of the first dopant decreases in a gradient towards the surface portion and the concentration of the second dopant decreases in a gradient towards the bulk portion. The concentration of the first dopant in the bulk portion and of the second dopant in the surface portion can be same or different. Each possibility represents a separate embodiment of the invention. In some embodiments, the bulk portion is not doped with a second dopant and the surface portion is not doped with a first dopant. In other embodiments, the surface portion is further doped with a first dopant, having a lower concentration than in the bulk portion.

In one particular embodiment, the electrode is composed of $\alpha\text{-Fe}_2\text{O}_3$, the bulk portion is doped with Pt and the surface portion is not doped. In another particular embodiment, the electrode is composed of $\alpha\text{-Fe}_2\text{O}_3$, the bulk portion is doped with Pt and the surface portion is doped with Ni or Co. Each possibility represents a separate embodiment of the invention.

In some exemplary embodiments, the electrode is composed of $\alpha\text{-Fe}_2\text{O}_3$, at least a fraction of the bulk portion is doped with Ti and the surface portion is doped with Zn. In further embodiments, the electrode is composed of $\alpha\text{-Fe}_2\text{O}_3$, the bulk portion is doped with Ti and the surface portion is doped with Zn. In certain embodiments, the concentration of Ti and Zn is about 1% at.

In further exemplary embodiments, the electrode is composed of $\alpha\text{-Fe}_2\text{O}_3$, at least a fraction of the bulk portion is doped with Ti and the surface portion is not doped. In further embodiments, the electrode is composed of $\alpha\text{-Fe}_2\text{O}_3$, the bulk portion is doped with Ti and the surface portion is not doped. In certain embodiments, the concentration of Ti is about 1% at.

In certain embodiments, the electrode is composed of $\alpha\text{-Fe}_2\text{O}_3$, at least a fraction of the bulk portion has oxygen vacancies and the surface portion has iron vacancies. In further embodiments, the electrode is composed of $\alpha\text{-Fe}_2\text{O}_3$, the bulk portion has oxygen vacancies and the surface portion has iron vacancies.

In some embodiments, the electrode according to the principles of the present invention is an anode or a photoanode. In certain such embodiments, the photoanode is composed of a semiconductor material. The photoanode can be used in combination with a metal cathode or a photocathode in a PEC cell. Each possibility represents a separate embodiment of the invention. In further embodiments, the electrode is composed of an n-type material. In certain embodiments, the photoanode is composed of an n-type semiconductor material.

In some embodiments, the electrode is a cathode or a photocathode. In certain such embodiments, the photocathode is composed of a semiconductor material. The photocathode can be used in combination with a metal anode or a photoanode in a PEC cell. Each possibility represents a separate embodiment of the invention. In further embodiments, the electrode is composed of a p-type material. In certain embodiments, the photocathode is composed of a p-type semiconductor material.

In alternative embodiments, the electrode is a photoanode composed of a p-type material. In further alternative embodiments, the electrode is a photocathode composed of an n-type material.

In another aspect there is provided a PEC cell comprising the PEC electrode according to the principles of the present invention. The PEC cell can be selected from a regular PEC cell, a tandem PEC cell or an inverse PEC cell. Each possibility represents a separate embodiment of the invention.

In some embodiments, the invention provides a regular PEC cell. The term "regular PEC cell", as used herein, refers in some embodiments to a PEC cell comprising a photoanode composed of an n-type semiconductor and a metal cathode. In other embodiments, the term "regular PEC cell", refers to a PEC cell comprising a photocathode composed of a p-type semiconductor and a metal anode.

In certain embodiments, the PEC cell comprises a photoanode and a metal cathode. FIG. 1F schematically represents a diagram of a regular PEC cell, which includes a photoanode according to the principles of the present invention. PEC cell 101 includes two electrodes—photoanode 103 and cathode 105. PEC cell 101 further includes electrolyte 107, disposed between photoanode 103 and cathode 105. Electrolyte 107 provides ionic contact between said two electrodes. Photoanode 103 and cathode 105 are further connected through external electric circuit 109 with power source 109a. Photoanode 103 includes surface portion 103a and bulk portion 103b.

When solar energy source 111 illuminates photoanode 103, photons are absorbed by photoanode 103 and excited electrons 113 are transferred to cathode 105 through external electric circuit 109. Without wishing to being bound by theory or mechanism of action, it is assumed that both bulk portion 103b and surface portion 103a of photoanode 103 absorb photons. Electrons 113 excited from the atoms of the photoanode material, which are disposed in surface portion 103a and bulk portion 103b have to travel along axis 121 to arrive at and to be transported through external circuit 109. Accordingly, the photoanode, including the bulk and the surface portions thereof, should be a good light absorber and a good conductor.

Electrons 113 arrive at cathode 105 where they take part in the half-cell reaction of hydrogen reduction (Formula 3).

$$2e^- + 2H^+ \rightarrow H_{2(g)} \qquad \text{Formula 3}$$

Holes 115 (h$^+$) in photoanode 103 are transported in the opposite direction towards surface portion 103a, where they participate in the second half-cell reaction of water oxidation (Formula 4).

$$H_2O_{(l)} + 2h^+ \rightarrow 2H^+ + \tfrac{1}{2}O_{2(g)} \qquad \text{Formula 4}$$

Protons are transferred to cathode 105 through electrolyte 107.

The water oxidation reaction takes place in surface portion 103a of photoanode 103. Accordingly, the photoanode, and in particular the surface portion thereof, should be a good catalyst for the water oxidation reaction. High catalytic efficiency can be expressed, for example, by low overpotential of the electrode in the water oxidation reaction. Without wishing to being bound by theory or mechanism of action, it is contemplated that the non-uniform doping of the electrode according to the principles of the present invention provides the high catalytic activity thereof in the water oxidation reaction. Furthermore, the non-uniform doping affords for the high catalytic activity of the electrode without reducing its conductivity and light absorption ability.

In some embodiments, the regular PEC cell includes an electrode, according to the principles of the present invention, which is a photoanode. In certain such embodiments, the electrode material is an n-type material, the bulk portion and the surface portion include at least one dopant, which is an n-type dopant, and the concentration of the at least one dopant in the bulk portion is higher than in the surface portion of the electrode. In additional embodiments, the electrode material is an n-type material, the bulk portion includes at least one dopant, which is an n-type dopant and the surface portion is not doped. In other embodiments, the electrode material is an n-type material, the bulk portion includes a first dopant being an n-type dopant and the surface portion includes a second dopant being a p-type dopant.

In certain embodiments, the PEC cell comprises a photocathode and a metal anode. In certain such embodiments, the photocathode adsorbs the photons of the solar energy source and exited holes are transferred to the metal anode, where they participate in the water oxidation reaction. The electrons travel in the opposite direction to the surface portion of the photocathode, where they participate in the hydrogen reduction reaction. Accordingly, the photocathode, including the bulk and the surface portions thereof, should be a good light absorber and a good conductor. The photocathode, and in particular the surface portion thereof, should be a good catalyst for the hydrogen reduction reaction. Without wishing to being bound by theory or mechanism of action, it is contemplated that the non-uniform doping of the electrode according to the principles of the present invention provides for the high catalytic activity thereof in the hydrogen reduction reaction. Furthermore, the non-uniform doping affords for the high catalytic activity of the electrode without reducing its conductivity and light absorption ability.

In some embodiments, the regular PEC cell includes an electrode, according to the principles of the present invention, which is a photocathode. In certain such embodiments, the electrode material is a p-type material, the bulk portion and the surface portion include at least one dopant, which is a p-type dopant, and the concentration of the at least one dopant in the bulk portion is higher than in the surface portion of the electrode. In additional embodiments, the electrode material is a p-type material, the bulk portion includes at least one dopant, which is a p-type dopant and the surface portion is not doped. In other embodiments, the electrode material is a p-type material, the bulk portion includes a first dopant being a p-type dopant and the surface portion includes a second dopant being an n-type dopant.

In some embodiments, the invention provides a tandem PEC cell. The term "tandem PEC cell", as used herein, refers in some embodiments to a PEC cell comprising a photoanode composed of an n-type semiconductor and a photocathode composed of a p-type semiconductor. In certain embodiments, the PEC cell comprises a photoanode according to the principles of the present invention and a photocathode according to the principles of the present invention. In certain such embodiments, electrons are excited in the photoanode and transferred to the photocathode and holes are excited in the photocathode and transferred to the photoanode. The water oxidation reaction takes place in the surface portion of the photoanode and the hydrogen reduction reaction takes place in the surface portion of the photocathode. Accordingly, in some embodiments, both the photoanode and the photocathode, including the bulk and the surface portions thereof, should be good light absorbers and good conductors. In further embodiments, the photoanode, and in particular the surface portion thereof, should be a good catalyst for the water oxidation reaction and the photocathode, and in particular the surface portion thereof, should be a good catalyst for the hydrogen reduction reaction.

In some embodiments, the tandem PEC cell includes two electrodes, according to the principles of the present invention, one of which is a photoanode and another one is a photocathode. In certain such embodiments, the photoanode material is an n-type material, the bulk portion and the surface portion include at least one dopant, which is an n-type dopant, and the concentration of the at least one dopant in the bulk portion is higher than in the surface portion of the photoanode. In further embodiments, the photocathode material is a p-type material, the bulk portion and the surface portion include at least one dopant, which is a p-type dopant, and the concentration of the at least one dopant in the bulk portion is higher than in the surface portion of the photocathode. In additional embodiments, the photoanode material is an n-type material, the bulk portion includes at least one dopant, which is an n-type dopant and the surface portion is not doped. In further embodiments, the photocathode material is a p-type material, the bulk portion includes at least one dopant, which is a p-type dopant and the surface portion is not doped. In other embodiments, the photoanode material is an n-type material, the bulk portion includes a first dopant being an n-type dopant and the surface portion includes a second dopant being a p-type dopant. In further embodiments, the photocathode material is a p-type material, the bulk portion includes a first dopant being a p-type dopant and the surface portion includes a second dopant being an n-type dopant.

In some embodiments, the invention provides an inverse PEC cell. The term "inverse PEC cell", as used herein, refers in some embodiments to a PEC cell comprising a photoanode composed of a p-type semiconductor and a metal cathode. In other embodiments, the term refers to a PEC cell comprising a photocathode composed of an n-type semiconductor and a metal anode. In further embodiments, the term refers to a PEC cell comprising a photoanode composed of a p-type semiconductor and a photocathode composed of an n-type semiconductor.

In some embodiments, the inverse PEC cell includes an electrode, according to the principles of the present invention, which is a photoanode. In other embodiments, the inverse PEC cell includes an electrode, according to the principles of the present invention, which is a photocathode. In additional embodiments, the inverse PEC cell includes two electrodes, according to the principles of the present invention, one of which is a photoanode and another one is a photocathode.

The electrodes according to the principles of the present invention can be prepared by any fabrication process, as known in the art, including, but not limited to, pulsed laser deposition (PLD), physical vapor deposition (PVD), chemical vapor deposition (CVD), electrodeposition, electroless deposition, and atomic layer deposition (ALD). For example, hematite electrodes can be deposited by pulsed laser deposition (PLD) using a PVD workstation. PLD works by focusing a high power pulsed excimer laser (KrF, $\lambda=248$ nm) beam on a target inside a vacuum chamber. The ablated material goes to the gas phase creating a plume that deposits on the substrate. This process can occur in vacuum as well as in the presence of oxygen or other gases at pressures of up to ~200 mTorr. In order to deposit hematite thin films with different dopants ceramic targets of undoped $Fe_2O_3$ and $Fe_2O_3$ doped with different dopants can be used. The targets can be produced by solid state reaction route using high purity powders of the base oxides of iron and the desired metal dopants. The non-uniform doping can be achieved by any suitable doping technique, as known in the art, such as, but not limited to chemical vapor deposition and pulsed laser deposition. For example, US Patent Application No. 20060024928 describes a method for controlling dopant concentration in semiconductor structures.

As used herein and in the appended claims the singular forms "a", "an," and "the" include plural references unless the content clearly dictates otherwise. Thus, for example, reference to "axis" includes a plurality of such axes, and equivalents thereof. It should be noted that the term "and" or the term "or" is generally employed in its sense including "and/or" unless the content clearly dictates otherwise. As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed methods.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1

Computational Methods

The calculations were performed using Vienna Ab-initio Simulation Package (VASP), (Bengone, O.; Blöchl, P.; Alouani, M.; Hugel, J. *Implementation of the Projector Augmented Wave Lda and U Method*; 2000; Kresse, G.; Hafner, J., *Physical Review B* 1993, 47, 558-561; Kresse, G.; Furthmüller, J., Computational Materials Science 1996, 6, 15-50).

Spin polarized DFT+U formalism of Dudarev et al. (*Physical Review B* 1998, 57, 1505) was chosen since $Fe_2O_3$ is a first row transition metal oxide containing highly correlated 3d electrons, whose electron-electron interactions are ill described by regular exchange-correlation (XC) approximations of DFT (Anisimov, V. I.; Aryasetiawan, F.; Lichtenstein, A., *Journal of Physics: Condensed Matter* 1997, 9, 767; Sandratskii, L.; Uhl, M.; Kübler, J., Band *Journal of Physics: Condensed Matter* 1996, 8, 983; Rollmann, G.; Rohrbach, A.; Entel, P.; Hafner, J., *Physical Review B* 2004, 69, 165107).

A U value of 4.3 [eV] that was derived ab-initio was chosen for iron (Fe) atoms in order to best describe the ground state properties of $Fe_2O_3$ (Mosey, N. J.; Liao, P.; Carter, E. A., *The Journal of chemical physics* 2008, 129, 014103; Pauling, L.; Hendricks, S. B., *Journal of the American Chemical Society* 1925, 47, 781-790).

A Perdue-Burke-Ernzerhof (PBE) Perdew, J. P.; Burke, K.; Ernzerhof, M., *Physical Review Letters* 1996, 77, 3865-3868; Perdew, J. P.; Burke, K.; Ernzerhof, M., [Phys. Rev. Lett. 77, 3865 (1996)]. *Physical Review Letters* 1997, 78, 1396-1396.

XC functional was chosen due to previous results correctly describing similar systems containing $Fe_2O_3$ and Pt metal. (Liao, P.; Keith, J. A.; Carter, E. A., *Journal of the American Chemical Society* 2012, 134, 13296-13309; Pozun, Z. D.; Henkelman, G., *The Journal of chemical physics* 2011, 134, 224706; Fajin, J. L.; DS Cordeiro, M. N. l.; Gomes, J. R., *The Journal of Physical Chemistry A* 2014; Viñes, F.; Neyman, K. M.; Görling, A., *The Journal of Physical Chemistry A* 2009, 113, 11963-11973; Kokalj, A.; Causá, M., *Journal of Physics: Condensed Matter* 1999, 11, 7463).

Projected augmented wave (PAW) potentials (Kresse, G.; Joubert, D., *Physical Review B* 1999, 59, 1758; Blöchl, P. E., *Physical Review B* 1994, 50, 17953-17979), were used to represent the frozen core electrons and nuclei of each atom. For all bulk calculations the 6s, 5p and the 5d orbitals of Pt, 4s and 3d of Fe and 2s and 2p of O were used as valence shells and all other inner electrons replaced by appropriate PAW potentials. In surface slab calculations the 3p Fe electrons were also used in the Fe valence shell since surface properties required the addition of Fe p orbitals and allowed the comparison with previous work on doped $Fe_2O_3(0001)$, included explicit Fe p orbitals (Liao, P.; Keith, J. A.; Carter, E. A., *Journal of the American Chemical Society* 2012, 134, 13296-13309).

The Kohn-Sham equations were solved with a plane wave basis set in three dimensional periodic boundary conditions to self-consistency with a tolerance of $10^{-5}$ [eV] in total energy. Symmetry was not imposed to allow an accurate description of distortions within the lattice. K-space integration was performed using the tetrahedron method with Blöchl corrections (Blöchl, P. E.; Jepsen, O.; Andersen, O. K., *Physical Review B* 1994, 49, 16223; Lehmann, G., *Phys. Status Solidi b* 1972, 57, 815). Ionic charges were calculated using the Bader charge scheme (Henkelman, G.; Arnaldsson, A.; Jónsson, H., *A Computational Materials Science* 2006, 36, 354-360). The Bader Fast Fourier Transform (FFT) grids were converged for ionic charges tolerances of 0.05e.

The calculations involve three main structures, including pure $Fe_2O_3$ in the rhombohedral primitive cell, Pt-doped $Fe_2O_3$ in the rhombohedral 2×2×2 supercell, and a (0001) (1×1) surface slab for both pure and Pt-doped $Fe_2O_3$. For the slab structure, free energies calculations were required for intermediate reaction steps of water oxidation.

Nb-Doped $Fe_2O_3$

For Nb experiments, an ab-initio derived value of U-J=4.3 eV (Mosey, N. J.; Liao, P.; Carter, E. A., *The Journal of Chemical Physics* 2008, 129, 014103) was chosen for Fe atoms, while zero for O, Nb and H atoms that are closed-shell in their corresponding stable oxidation states. Nuclei and core electrons where described by PAW potentials such that only the 6, 14, 11 and 1 valence electrons of $O-2s^22p^4$, $Fe-3p^63 d^64 s^2$, $Nb-4p^65 s^14 d^4$, and $H-1s^1$, respectively, where considered explicitly.

Several computational settings were used to achieve convergence. Ion positions were relaxed using conjugated gradient method and the stopping criterion for the ionic relaxation was chosen for all forces to be smaller than $3*10^{-2}$ eV/Å. No symmetry was imposed. An energy cutoff of 700 eV converged the total energy to less than 1 meV per atom. 4×4×4 and 3×3×1 gamma-centered k-space grid for the bulk and surface, respectively converged the total energy to 1 meV. Ionic relaxation was done with Gaussian smearing method with smearing width of 0.01 eV for fast relaxation, and the last iteration was done with Tetrahedron method with Blöchl corrections.

Due to similarity of ionic radii (Shannon, R., Acta *Crystallographica Section A* 1976, 32, 751-767), the Nb was inserted in the slab as an Fe substitution defect and not as interstitial defect as detected experimentally (Sanchez, C.; Hendewerk, M.; Sieber, K. D.; Somorjai, G. A., *J. Solid State Chem.* 1986, 61, 47-55). Although Nb has some solubility in $Fe_2O_3$ of up to 2±1 at % (Turnock, A. C., *J. Am. Ceram. Soc.* 1966, 49, 177-180), Nb was substituted in a slab with 32 atoms (7 at %) in order to have a direct comparison to pervious calculations with other dopants using the same level of theory (DFT+U) (Liao, P.; Keith, J. A.; Carter, E. A., *J. Am. Chem. Soc.* 2012, 134, 13296-13309). Furthermore, when a longer slab with 39 atoms (5 at %) was used, the overpotential changes by less than 0.02 eV. The initial position of terminating hydrogen atoms was placed according to the information given in previous calculations. All slab calculations were converged with a 10 [Å] vacuum.

Example 2

Pure $Fe_2O_3$ Calculations

Figures 2A, 2B:
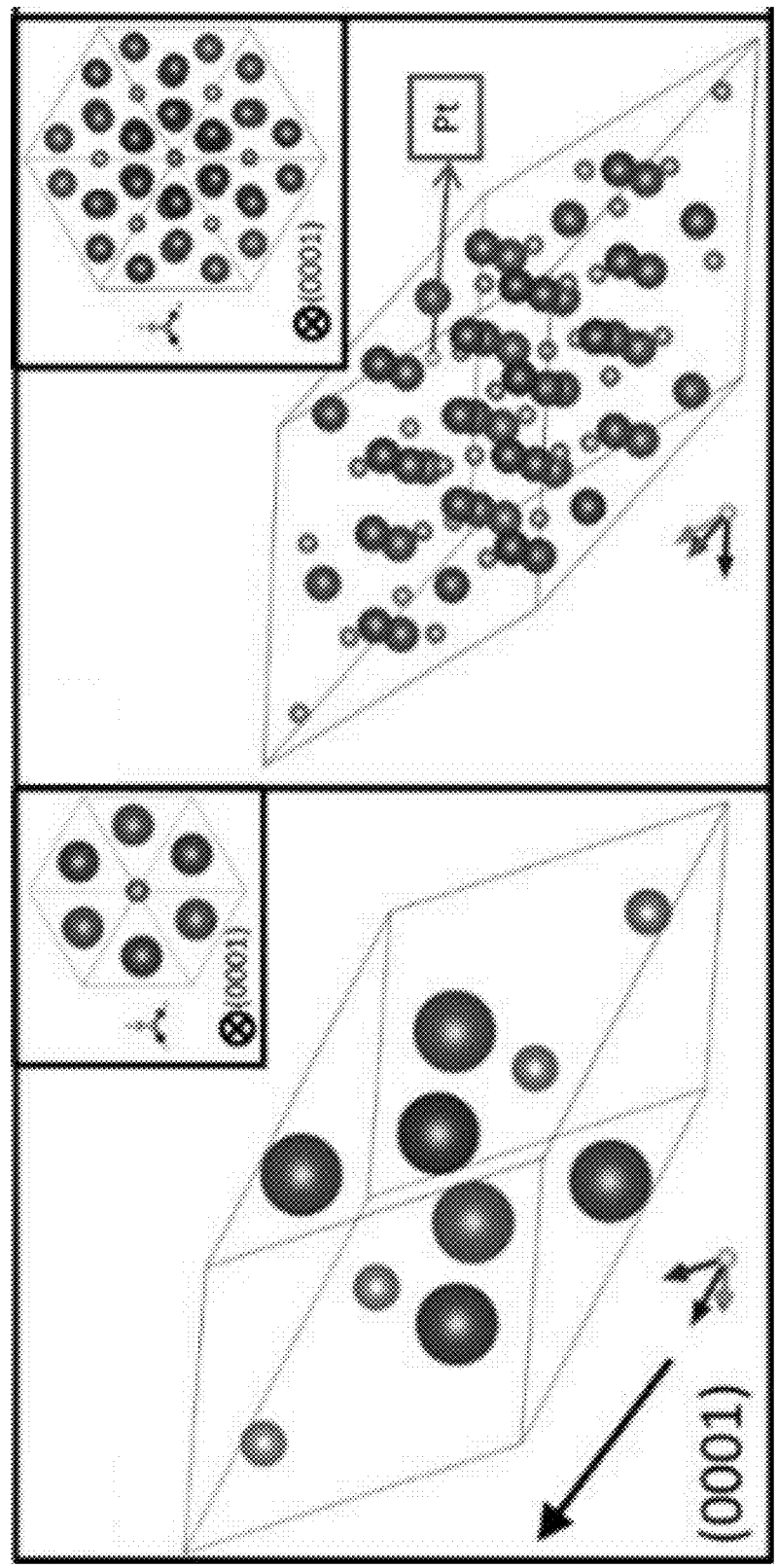
FIGS. 2A-2C: A schematic representation of the unit cells: (2A) pure $Fe_2O_3$ primitive cell (2B) Pt-doped $Fe_2O_3$ supercell (2C) fully hydroxylated (0001) (1×1) surface pure $Fe_2O_3$ slab (upper half of cell displayed). The cells are shown at their relaxed geometries. The Pt substituent in the bulk supercell and the two different substitutional sites in the (0001) surface are indicated. Images were created using VESTA visualizing software.

The pure $Fe_2O_3$ structure was used for comparison to Pt-doped $Fe_2O_3$. Pure $Fe_2O_3$ has a 10-atom primitive rhombohedral cell (FIG. 2a). The full long range antiferromagnetic ordering of $Fe_2O_3$ was taken into account (Morin, F. J., *Physical Review* 1950, 78, 819-820; Searle, C. W.; Dean, G. W., *Physical Review B* 1970, 1, 4337-4342).

A 7×7×7 gamma-centered k-space grid and a plane wave energy cutoff of 700 [eV] converged the cell energy to a tolerance of <1 [meV/atom]. The cell shape, volume and ionic positions were relaxed. Ionic forces were converged to a minimum with a tolerance of 0.03 [eV/Å].

Example 3

Pt-Doped $Fe_2O_3$ Calculations

An 80-atom 2×2×2 supercell was used for Pt-doped $Fe_2O_3$ (FIG. 2b). Pt was considered at a substitutional and not an interstitial site, which is a good assumption for a dopant with low misfit (<15%) in ionic and crystal radii ($Fe^{+3}$: $r_c$=0.785[Å], $r_i$=0.645[Å], $Pt^{+4}$: $r_c$=0.765[Å], $r_i$=0.625[Å], $Pt^{+2}$: $r_c$=0.94[Å], $r_i$=0.8[Å]). Pt atoms were set to replace Fe atoms with the relations 1:32 Pt:Fe, corresponding to 1.25% at Pt-doping. This concentration agrees with evidence of high miscibility of Pt in $Fe_2O_3$ based on X-ray measurements (Hu, Y.-S.; Kleiman-Shwarsctein, A.; Forman, A. J.; Hazen, D.; Park, J.-N.; McFarland, E. W., *Chemistry of Materials* 2008, 20, 3803-3805; Mao, A.; Park, N.-G.; Han, G. Y.; Park, J. H., *Nanotechnology* 2011, 22, 175703; Hsu, Y.-P.; Lee, S.-W.; Chang, J.-K.; Tseng, C.-J.; Lee, K.-R.; Wang, C.-H., *Int. J. Electrochem. Sci* 2013, 8, 11615-11623; Rahman, G.; Joo, O.-S *Materials Chemistry and Physics* 2013, 140, 316-322).

This specific concentration was chosen also to be within the range of 0.1-4% at doping measured for optimal photoelectrochemical activity. A 3×3×3 gamma centered k-space grid and plane wave energy cutoff of 700 [eV] converged the supercell to a tolerance of <1 [meV/atom]. The k-space grid size is consistent with bulk $Fe_2O_3$ dimensions. The supercell shape and volume were not relaxed from the pure $Fe_2O_3$ structure since it appears that fully relaxing the structure changes the total energy to <0.01 [eV/atom]. Ionic forces were relaxed by movement in atomic positions with a tolerance of 0.03 [eV/Å]. Pt was not treated with DFT+U (that is, the U value is zero) since there was no apparent contribute to the accuracy of the calculation (U=1, 2, 3, 4.3 eV on Pt resulted in unphysically occupying an extra electron on all Fe d states that are strongly hybridized with Pt d states).

Example 4

$Fe_2O_3$ (0001) Surface Calculations

Modeling of Pt-doped $Fe_2O_3$ at (0001) termination was chosen since this is one of the stable orientations of $Fe_2O_3$ (Nguyen, M.-T.; Seriani, N.; Piccinin, S.; Gebauer, R., *The Journal of chemical physics* 2014, 140, 064703; Lad, R. J.; Henrich, V. E., *Surface science* 1988, 193, 81-93), and allow the comparison with previously studied doped $Fe_2O_3$ (0001). The slab contains five O atom layers, each containing surrounding Fe atoms (FIG. 2c), which make up a four stoichiometric units thick slab. This slab thickness and a 10 [Å] vacuum layer were previously found to converge surface properties. Additionally, the modeling of $Fe_2O_3$ surface was done in a vacuum environment, as the presence of water shown to give insignificant change in the results for pure and doped $Fe_2O_3$(0001).

Figure 2C:
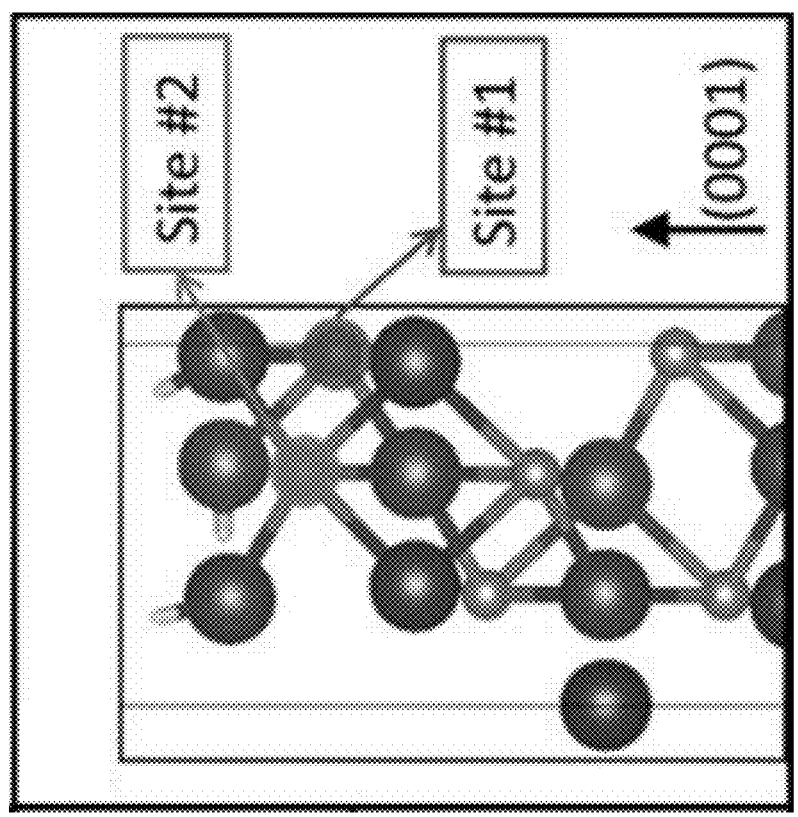

Pt atoms were placed at two possible substitutional sites near the surface. The first site (site #1) is located right below the surface vacancy, and the second site (site #2) is closest to the surface as seen in FIG. 2c. A plane wave energy cutoff of 700 [eV] and a gamma-centered k-grid of 3×3×1 converged the slabs within a tolerance of <1 [meV/atom], consistent with $Fe_2O_3$ bulk dimensions. In all structures ionic positions were relaxed allowing Pt to induce structural changes within the lattice and additionally allowing the surfactant to reach a minimal energy orientation with a tolerance of 0.03 [eV/Å].

Slab structures were used in order to calculate the free energies involved in water oxidation on Pt-doped $Fe_2O_3$ (0001). Previously proposed reaction mechanism composed of five intermediate steps was considered. The proposed mechanism includes the adsorbtion of water moleculesto the surface, deprotonation of adsorbed water molecules, and finally, the release of $O_2$. (Liao, P.; Keith, J. A.; Carter, E. A., *Journal of the American Chemical Society* 2012, 134, 13296-13309; Rossmeisl, J.; Qu, Z.-W.; Zhu, H.; Kroes, G.-J.; Norskov, J. K., *Journal of Electroanalytical Chemistry* 2007, 607, 83-89; Valdes, A.; Qu, Z.-W.; Kroes, G.-J.; Rossmeisl, J.; Norskov, J. K., Oxidation and Photo-Oxidation of Water on TiO2 Surface. 2008; Man, I. C. et. al. *Chem Cat Chem* 2011, 3, 1159-1165; Norskov, J. K. et. al. *The Journal of Physical Chemistry B* 2004, 108, 17886-17892).

The reaction steps, such that * represents the surface, are:

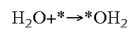

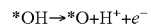

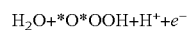

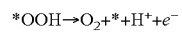

Formula 5

Where * represents the surface slab and *OH, for example, represents the surface slab with an adsorbed OH group (vac represents a surface O vacancy). Following this mechanism, the changes in Gibb's free energies for intermediate reaction steps were calculated using the following equations:

$$\Delta G_1 = \tfrac{1}{2}E_{*OH_2} - (\tfrac{1}{2}E_{*vac} + E_{H_2O}) + \Delta\zeta_1$$

$$\Delta G_2 = \tfrac{1}{2}(E_{*OH} + E_{H_2}) - \tfrac{1}{2}E_{*OH_2} + \Delta\zeta_2$$

$$\Delta G_3 = \tfrac{1}{2}(E_{*O} + E_{H_2}) - \tfrac{1}{2}E_{*OH} + \Delta\zeta_3$$

$$\Delta G_{74} = \tfrac{1}{2}(E_{*OOH} + E_{H_2}) - (\tfrac{1}{2}E_{*O} + E_{H_2O}) + \Delta\zeta_4$$

$$\Delta G_5 = (\tfrac{1}{2}E_{*vac} + \tfrac{1}{2}E_{H_2} + E_{O_2}) - \tfrac{1}{2}E_{*OOH} + \Delta\zeta_5 \quad \text{Formula 6}$$

where $E_{*OH}$, for instance represents the total energy of a slab with OH adsorbent. Non adsorbed species energies were previously calculated separately in a large unit cell with a similar level of theory: −6.77 [eV], −9.87 [eV], and −14.22 [eV] for $H_2$, $O_2$ and $H_2O$, respectively. $\Delta\zeta_i$ represents the zero point energy (ZPE) differences as calculated for pure $Fe_2O_3$(0001). The reaction potential was defined to be the potential required to make all reaction steps have values $\Delta G_i \leq 0$, which means it is the largest value among them. The overpotential is defined to be the reaction potential minus the required potential for water oxidization (per hydrogen cleavage reaction). The exact geometries of transition states in the reaction scheme are unknown and hence this is only an estimate to the overpotential.

Example 5

Electronic Structure in Pure and Pt-Doped $Fe_2O_3$ 5.1 the Energy Gap $Fe_2O_3$ has an energy gap of 2.29 [eV], which is in a good agreement with the experimental value of 2.6±0.4 [eV][56]. Upon Pt-doping, there is an occupied state in the mid gap that shifts the Fermi level. The mid gap electronic state is located 1.05 [eV] below the conduction band edge, hence light should be absorbed in the infra-red (IR) spectrum to excite an electron from this state. Since the mid gap state is isolated and well below the conduction band edge then this state could participate in inhibiting electron conductivity by acting as a recombination center or as a low-energy electron trap, as was found in a previous work on several dopants in iron oxides (Liao, P.; Toroker, M. C.; Carter, E. A., *Nano Letters* 2011, 11, 1775-1781).

However, at a certain doping concentration range, the electron could transfer between degenerate low-energy states at identical Fe atoms as explained further in the second subsection.

Doping reduces the energy gap by about 0.15 [eV], when not taking into account any isolated states in the band gap with energies located both in the mid gap and at the band edges. When considering isolated states at the band edges, the energy gap is reduced by 0.72 [eV] (the energy gap reduces from 2.29 [eV] to 1.56 [eV]). Hence, Pt-doping should increase the range of absorption in the visible part of the spectrum, which is beneficial for PEC performance.

5.2 Density of States and Energetically Isolated States

The analysis of density of states (DOS) allowed the characterization of energetically isolated states at the mid gap and band edges. For pure $Fe_2O_3$, the projected density of states (PDOS) demonstrates that the conduction band is dominated by unoccupied Fe states while the valence band is primarily comprised of O states. The Fe and O states have primarily d-type and p-type character, respectively.

For Pt-doped $Fe_2O_3$, the DOS can be projected onto "defected" atoms whose associated states are affected by the dopant and all other "non-defected" atoms. The "defected" atoms include the two types of first and one second neighboring Fe atoms to Pt and also the nearest-neighbor O atoms to Pt, which are denoted according to their symmetry assignments relative to the location of the dopant: "$C_{3v}$ $Fe^{(+3)}$", "$C_{2v}$ $Fe^{(+2)}$", "$C_{4v}$ $Fe^{(+2)}$", and "$C_{3v}$ O", respectively as demonstrated in FIG. 3. "$C_{3v}$ $Fe^{(+3)}$" is an iron that neighbors three O atoms that are adjunct to Pt, a "$C_{2v}$ $Fe^{(+2)}$" is an iron that neighbors two O atoms that are adjunct to Pt, and "$C_{3v}$ O" is a tetrahedral coordinated O atom neighboring Pt and three Fe atoms. The "non-defected" atoms are denoted as "$O_h$ $Fe^{(+3)}$" and "$T_d$ $O^{(-2)}$" which correspond to bulk-like symmetry and charges. The mid gap state belongs to a "defected" Fe atom "$C_{4v}$ $Fe^{(+2)}$" that is second-nearest to the Pt-dopant. Therefore, Pt donates an excess electron to Fe. Comparing between the PDOS of "defected" and "non-defected" atoms reveals that isolated states at the band edges are associated with "defected" atoms, including Fe, O, and also Pt. Hence, as a result of Pt-doping, O p-states and the Fe d-states are shifted in energy as well as hybridized with Pt depending on whether the atoms are "defected" i.e. are in proximity with Pt.

5.3 Bader Charge Analysis

The DOS demonstrates that the electron donated by Pt resides on Fe, therefore, Bader charge analysis was used in order to directly present changes in atomic charges as a result of Pt-doping. For pure $Fe_2O_3$, Fe and O atoms have a Bader charge of +1.74e and −1.16e, respectively (with Fe 3p electrons treated explicitly in the valence the charges are +1.84e and −1.21e, respectively). These charges are related to the formal charges of $Fe^{+3}$ and $O^{-2}$. The Fe atoms' magnetic moments are 4.18 $\mu_B$ which suggest a high spin state associated with a $3d^5$ occupation. In Pt-doped $Fe_2O_3$, the $C_{4v}$ Fe atom has a magnetic moment of 3.5 $\mu_B$ and a low Bader charge of +1.41e. Consistent with the DOS analysis, this suggests that this atom received an extra electron as a result of Pt-doping and is in a $Fe^{+2}$ oxidation state.

The Pt atom's Bader charge is +1.47e and the on-site magnetic moment is zero (this result remained the same when choosing different initial magnetic moments and geometries). The latter suggests a low spin state, but it is difficult to determine the oxidation state since Bader charges do not equal integer formal charges. In previous theoretical work with PBE, the $Pt^{+4}$ Bader charge in $PtO_2$ oxide was calculated to be +1.74e (Dianat, A.; Seriani, N.; Bobeth, M.; Pompe, W.; Ciacchi, L. C., *The Journal of Physical Chemistry C* 2008, 112, 13623-13628).

In contrast, a charge significantly lower than the previously disclosed one indicating a $Pt^{+2}$ state was identified. In addition, using the Bader charge on Pt as a reference to that on the rest of the atoms and to previous work in $Fe_2O_3$ using other dopants ($Si^{+4}$:+3.1e, $Ti^{+4}$:+2.3e, $Ni^{+2}$:+1.2e, $Co^{+2}$:+1.3e, $Mn^{+2}$:+1.5e), validates the obtained $Pt^{+2}$ oxidation state value due to a total lattice neutrality requirement. For the six O atoms surrounding the Pt-dopant, there is an excess Bader charge of +0.1e (compared to bulk charges). Combining these excess charges on O atoms brings a total of +0.63e charge, which is quite significant. This means the O atoms surrounding the dopant share two delocalized holes; hence, the overall charge on Pt and its neighboring O atoms is +4. It is noted that the charge on Pt remains +2, regardless of substitution position (two possible sites in the slab are considered in the third subsection).

The results point out that Pt donates an electron, but the resulting positive charge on Pt is spread out toward neighboring O atoms. Hence, the charge on Pt is not the same as typical n-type dopants that have a charge larger than +3.

Since holes are delocalized over O atoms then their associated states (near the valence band edge) could participate in promoting hole transport.

5.4 Ligand Field Theory (LFT) Analysis

LFT was used in order to explain the changes in atomic charges according to atomic positions relative to Pt. Pt doping breaks the symmetry in the lattice and as a result the six O atoms surrounding Pt have higher energies and loose electron charge, while the next-nearest neighbor Fe to Pt has lower energy levels and accepts an extra electron. The atomic energy levels shift as a result of many factors including these symmetry breakings which accounts for the central difference between atoms.

Another major cause for energy level movement is hybridization. The DOS shows that the new isolated "defected" states at the band edges are highly hybridized. The higher energy O state that accepts holes hybridizes with Pt $e_g$ states as the conduction band edge involves Pt and O states. Furthermore, low energy $Fe^{+2}$ and Pt $t_{2g}$ states hybridize strongly, as the top of the valence band involves isolated Pt and $Fe^{+2}$ states. The hybridization of Pt and O atoms can be further supported by calculated mean Pt—O distances comparable with undoped bulk Fe—O distances. The group of short Pt—O bonds is on average 2.02 [Å], longer than the group of short Fe—O bonds in the undoped bulk (1.96 [Å]), while the group of long Pt—O has a mean bond length of 2.04 [Å], which is shorter than the undoped group of long Fe—O bonds (2.12 [Å]). These distances imply that Pt, partly due to its larger size, is generally closer to O atoms than bulk Fe is, and lowers the differences of short and long bonds to O atoms, which assists in hybridization of states and should aid in charge transport. This sort of high hybridization of dopant and O and Fe atoms in $Fe_2O_3$ is unconventional and not usually seen in other n-type dopants such as titanium, and contributes to the reason Pt has good qualities for PEC performance.

Example 6

Electron Transport Through Pt-Doped $Fe_2O_3$

Figures 4A, 4B:
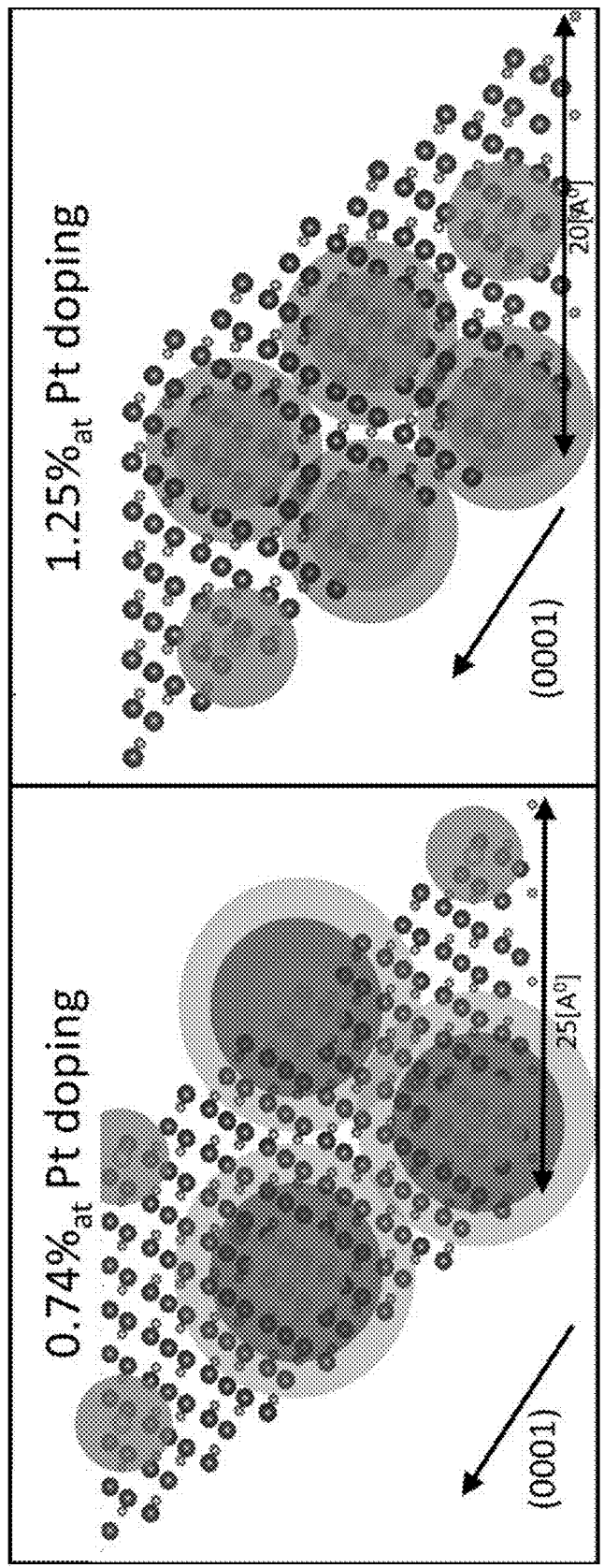
FIGS. 4A-4B: Illustration of Fe atom locations at "rings" around Pt in different doping levels. (4A) 0.74% at doping, a 3×3×3 supercell with two Pt dopants is repeated periodically in space twice in all directions for better viewing of Pt—Pt distances, dopant locations are such that Pt—Pt distances are ~8-13 [Å] depending on the spatial direction. (4B) 1.25% at doping, the 2×2×2 doped supercell is repeated periodically in space twice in all directions for better viewing of the Pt—Pt distances, Pt—Pt distances are 10.15-10.94 [Å]. Pt dopants are located in the centers of the proposed "rings" (the first and third ring around Pt indicated in blue, the second in red). Created using VESTA visualizing software.

The Pt dopant is surrounded by spherical regions of identical atoms that serve as possible routes for electron transport. As can be seen in FIG. 4, a three-dimensional sphere of Fe atoms $2^{nd}$ neighboring to Pt is located around the dopant. This "$2^{nd}$ ring" contains Fe atoms with $C_{4v}$ symmetry. The excess electrons donated by Pt are always calculated to be in the $2^{nd}$ ring. The distances between close Fe atoms inside this ring vary in the ranges of 3-4 [Å]. A $3^{rd}$ ring of Fe atoms farther away from the dopant has less symmetry breaking, a lower energy splitting, and thus a higher free energy is required for electron transfer between rings. A $4^{th}$ ring is located at larger distance from Pt, and so on.

Figure 5A:
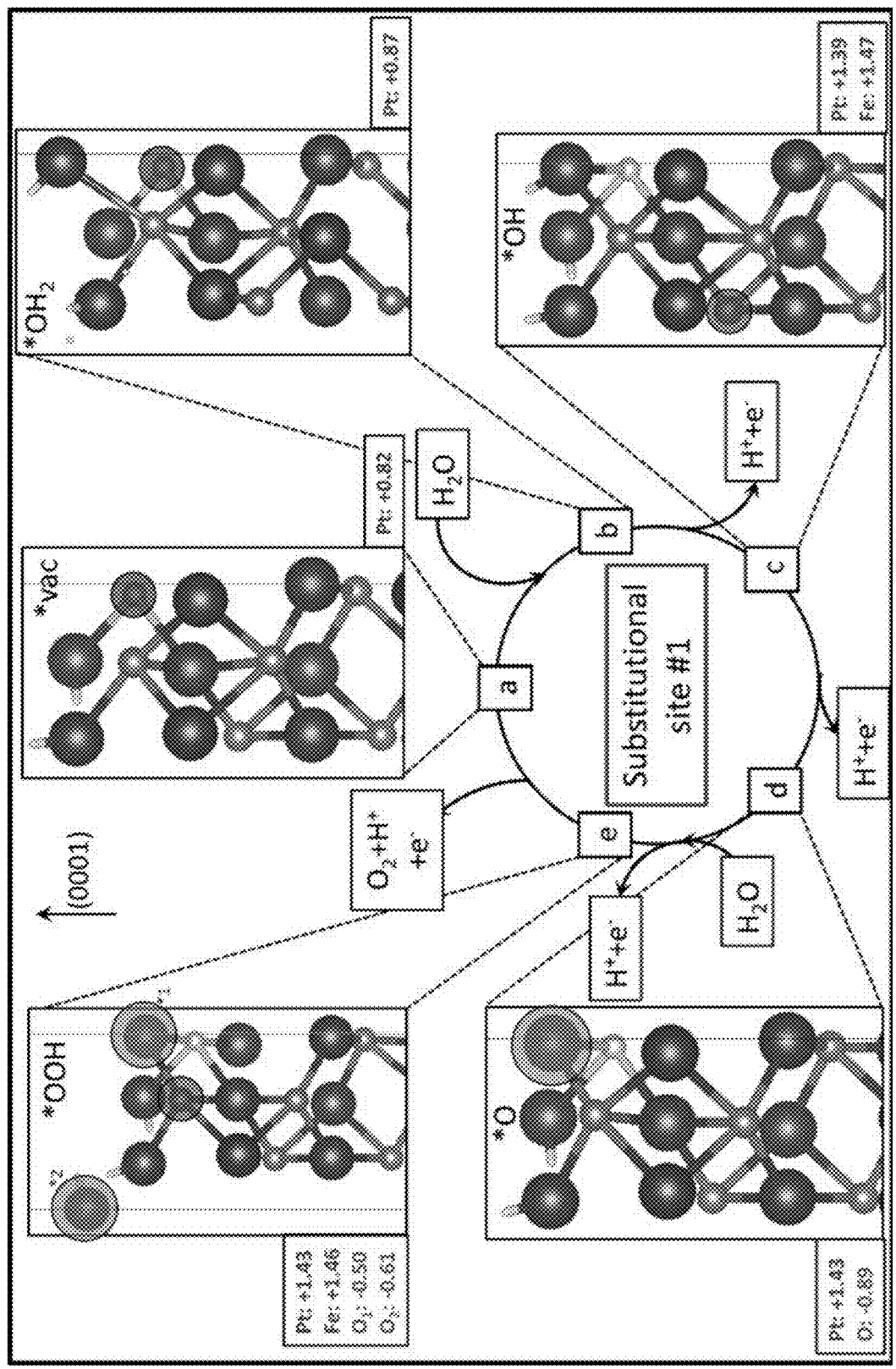
FIGS. 5A-5B: Illustration of water oxidization reaction pathway on $Fe_2O_3$(0001) with (5A) Pt-doped at site #1, and (5B) at site #2. Indices a-e indicate the intermediate reactions and arrows indicate entering and leaving components. In the figure highlighted atoms are of unusual Bader charges written near the complexes in units of e charge. Non-indicated Bader charges are: −1.21e and +1.84 for O and Fe atoms. Created with VESTA visualizing software.
Figure 5B:
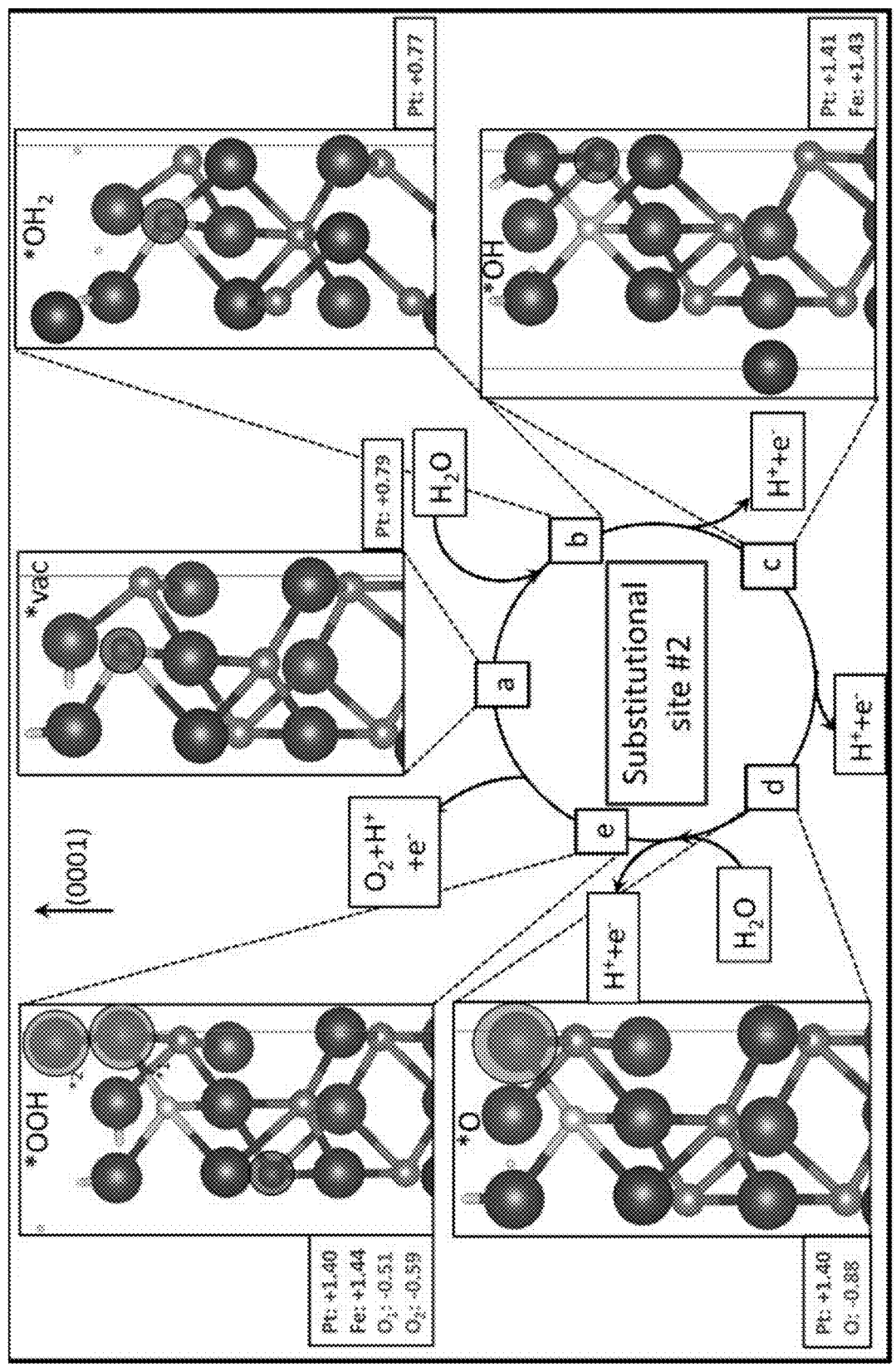

Electrons can hop relatively easily inside a given ring due to the similarity and closeness of the sites to one another. Electrons may also transfer between different rings, if identical rings overlap. As seen in FIG. 5, at doping concentration of 1.25% at, $2^{nd}$ Fe rings partially overlap, while at a concentration of 0.74% at the $2^{nd}$-$3^{rd}$ rings partially overlap. Since our calculations predict that the electrons prefer to localize at the $2^{nd}$ ring, then optimal doping concentration, as far as electron conductivity is concerned, would be when $2^{nd}$ rings overlap. However, since Pt atoms are not distributed completely evenly in the bulk due to the rhombohedral unit cell, the optimal doping level is a range required for overlap around the $2^{nd}$ ring, taking one more Fe neighbor on each side of the $2^{nd}$ ring.

Therefore, the optimal Pt-doping concentration is in the range of 0.64-2.96% at, which is in good agreement with experiment (0.1-4% at). When doping is lower than the optimal range, less favorable electron transport may be possible between non-identical rings. When doping is too high, there are less available electron acceptor $C_{4v}$ Fe sites since many are already occupied by electrons.

In order to show that the "extra" electron resides at the $2^{nd}$ "ring", calculation was also performed in the 80-atom 2×2×2 supercell while replacing two Fe atoms with Pt atoms, resulting in a 2.5% at Pt doping. The Pt atoms locations in the cell were chosen such that they were $2^{nd}$ neighbors to each other. The second substituent added was chosen to take the place of the "defected" Fe atom found in the previous calculations (the one carrying the "extra" electron in a $C_{4v}$ site). The results of this calculation were that "extra" electrons simply occupied a different $2^{nd}$ neighbor Fe in $C_{4v}$ symmetry. In addition, holes again were released to nearby O atoms from both Pt substituents. This assured that all $C_{4v}$ Fe sites are indeed symmetrical and electrons would occupy them and not sites closer to Pt.

This model only describes contributions to conductivity from the defected irons without considering the actual energy barrier of electron hopping. Furthermore, other competing effects such as scattering with phonons, recombination with holes, grain boundaries, structural changes, or other defects induced by lattice stresses were not considered.

Example 7

Water Oxidation on Pt-Doped $Fe_2O_3$ (0001)

The catalytic mechanism of water oxidation on pure $Fe_2O_3$ was compared with the one taking place on Pt-doped $Fe_2O_3$ (0001) slabs while allowing Pt atoms to substitute either one of two sites throughout the reaction as depicted in FIG. 5. Free energy differences for the different reaction steps of water oxidation, and their calculated estimated overpotentials are shown in Table 1. The free energy is largest in the third hydrogen (H) cleavage with water adsorption (step 4) for both substitutional doping sites. Also, the free energy lowers quite significantly in the second H cleavage (step 3) for both sites. This simultaneous decrease in the energy required for second hydrogen cleavage and increase in energy in the third hydrogen cleavage (along with water adsorption) was previously calculated for a variety of materials (Man, I. C. et. al. *Chem Cat Chem* 2011, 3, 1159-1165; Fernandez, E. M. et. al. *Angewandte Chemie International Edition* 2008, 47, 4683-4686), including n-type titanium-doped $Fe_2O_3$ (Liao, P.; Keith, J. A.; Carter, E. A., *Journal of the American Chemical Society* 2012, 134, 13296-13309). As a result, the overpotential in both sites rises by about 1 [V] compared to pure $Fe_2O_3$ (Table 1), which is unwanted for high water splitting efficiency (note that if the total energy of the oxygen molecule is used such that the required potential for water oxidation equals experimental value of 1.23 [eV], the free energy of step 5, the final release of *OOH complex, increases by 0.49 [eV] in both doped structures, not changing the overpotential).

TABLE 1

Free energy differences for the different reaction steps of water oxidation, and their calculated estimated overpotentials

|  | $\Delta G_1$ [eV] | $\Delta G_2$ [eV] | $\Delta G_3$ [eV] | $\Delta G_4$ [eV] | $\Delta G_5$ [eV] | estimated overpotential $\phi$ [V] |
|---|---|---|---|---|---|---|
| Pure $Fe_2O_3$[12] | 0.05 | −0.03 | 1.82 | 1.69 | 0.90 | 0.71 |
| Doped site #1 | 0.99 | −0.25 | 0.46 | 2.88 | 0.34 | 1.77 |
| Doped site #2 | 0.35 | 0.36 | 0.47 | 2.83 | 0.40 | 1.72 |
| Minimal conf. | 0.40 | 0.33 | 0.46 | 2.86 | 0.35 | 1.75 |

*Pure values were obtained from Liao, P.; Keith, J. A.; Carter, E. A., *Journal of the American Chemical Society* 2012, 134, 13296-13309.

7.1 Bader Charge Analysis

The calculated Bader charges of the Pt dopants throughout the reaction as depicted in FIG. 5) demonstrates that in both sites Pt changes oxidization from $Pt^{+1}$ (charge ~0.8e) to the preferred $Pt^{+2}$ (charge 1.4e) at the first H cleavage reaction (step 2). Pt was at a +1 oxidation state because an O atom vacancy near Pt donates an "extra" electron to Pt. In step 2, an Fe atom also has an "extra" electron (with charge +1.4e as depicted in FIG. 5), which is a phenomenon seen in the bulk and expected in the fully hydroxylated $Fe_2O_3$ surface since it is closest to the bulk structure. In addition, a positive hole charge is delocalized over the O and Fe atoms near the Pt dopant, also a phenomenon seen in bulk calculations. After the second H atom is cleaved (step 3), a hole is added to the Fe atom and also to a surface O atom (intermediate "d" in FIG. 5). Thus, after step 3 takes place all atoms in the system are in their preferred oxidization states, except for the surface oxygen, which can be explained as the reason for the significant decrease in free energy required for this step (Table 1) compared to water oxidization over pure $Fe_2O_3$. The adsorption of water and release of yet another H atom in step 4 generates a hole charge on top of the surface O atoms (FIG. 5). Since the material is overall deficient in one electron due to the H cleavage, and there are two holes at the surface, there is one additional electron on nearby Fe atoms. Two holes at the surface were also obtained for pure $Fe_2O_3$, and here an "extra" electron is located on the iron as a result of doping. Transition to this state (intermediate "e" in FIG. 5) is unwanted since before all charges were in balance and can be seen as the major cause for the deficiency in free energy required for step 4. This is the highest required free energy and thus the one determining the overpotential and rate limiting step of the reaction.

Pt-doping at site #1 and site #2 gives similar free energies in all reaction steps as demonstrated in Table 1. The major difference occurs in steps 1 and 2 which correspond to adsorption of water and the first H cleavage, respectively. Most of the free energy differences in these steps results from the higher stability of the slab doped at site #2 at the adsorbed water complex (*$OH_2$) (more stable by 0.58 [eV] per adsorption site). Thus, when Pt is too close to the proposed catalytic site it impairs water adsorption which in addition to the resultant increase in overpotential could be another reason not to dope with Pt at the surface. This difference in energy could be a result of the stronger ionic bond of the $Fe^{+3}$:$O^{-2}$ atoms of the entering water group in site #2 Pt-doped $Fe_2O_3$ compared to the ionic bond of $Pt^{+1}$:$O^{-2}$ atoms in site #1 doped $Fe_2O_3$.

Figure 6:
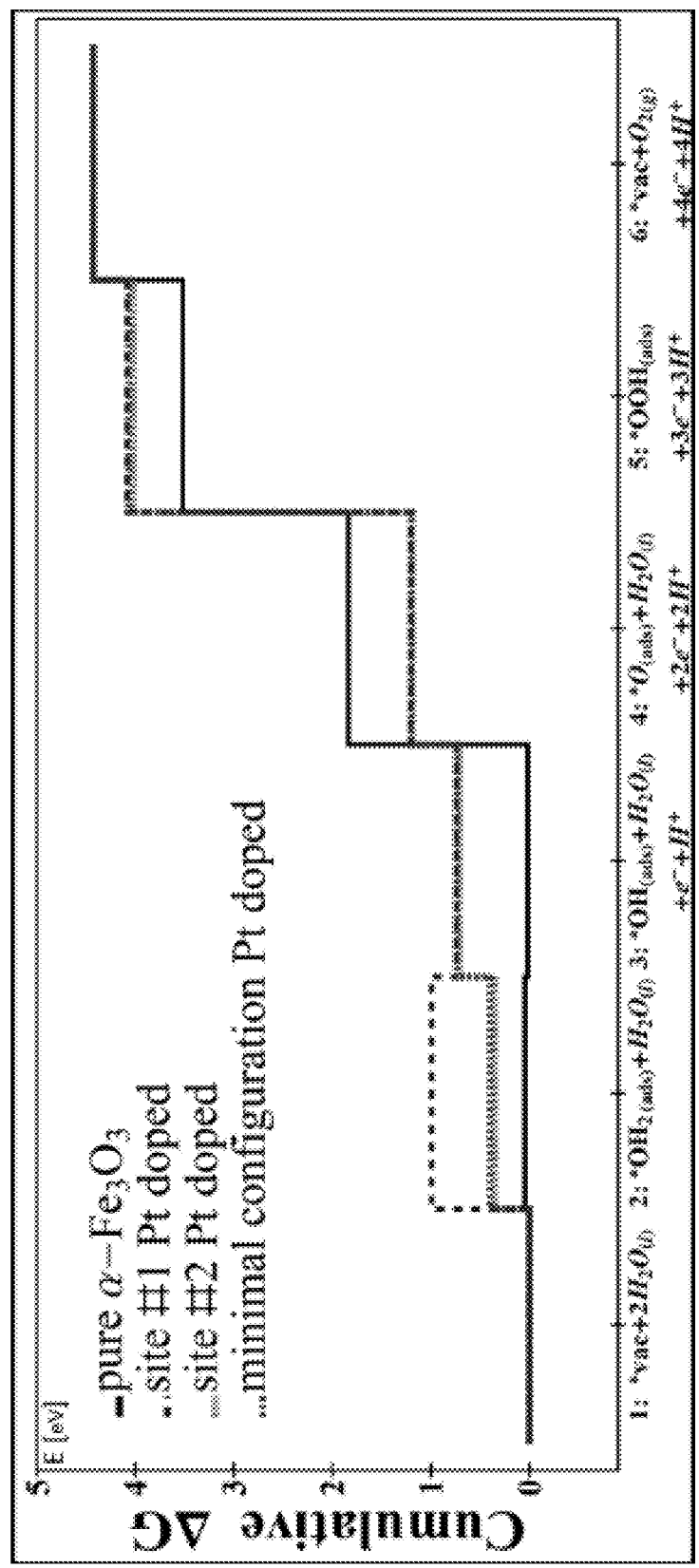
FIG. 6: Cumulative free energy for water oxidation on pure and Pt-doped $Fe_2O_3$ at two possible substitutional sites. The "minimal configuration" cumulative free energy allows Pt to choose the preferred substitutional site. The values for the pure case are obtained from Liao, P.; Keith, J. A.; Carter, E. A., *Journal of the American Chemical Society* 2012, 134, 13296-13309.

A postulated mechanism states that Pt may diffuse between the two sites marked #1 and #2. Such mechanism could only be possible if the characteristic time scale for the diffusion of Pt inside the lattice between two such location is on the same order of magnitude (or smaller) as the time scale for the specific reaction step. The working assumption is a reaction pathway which allows Pt to diffuse by selecting for each intermediate state the lowest energy slab with one of the two Pt substitutional sites. This reaction appears in FIG. 6 and Table 1 as "minimal configuration". The stable sites for complexes: *vac, *$OH_2$, *OH, *O and *OOH are respectively: #1, #2, #1, #1, #2. The energetic differences between sites are small (0.01-0.07 [eV]) for all configurations with the exception of *$OH_2$ previously discussed. Pt-doping, even when allowing diffusion among sites, increases the overpotential, and therefore Pt at any substitutional site near the surface would increase the overpotential (FIG. 6).

According to these results, doping with Pt has several features that can be beneficial for solar water splitting, and a few which decrease the efficiency of such process. In order to bypass this duality, gradient doping strategy which could be used for many other doped materials and many dopants other than Pt was found to be advantageous.

Example 8

Free Energies and Overpotential for Water Oxidation on $Fe_2O_3$ as a Function of the Dopant The analysis is based on the conventional approach developed by Norskov for modeling surface chemistry (Rossmeisl, J.; Qu, Z. W.; Zhu, H.; Kroes, G. J.; Norskov, J. K., J. Electroanal. Chem. 2007, 607, 83-89). The model is based on having a series of surface slab models representing intermediate reactions. The free energy required for each reaction step is calculated by solving the Konh-Sham equations self-consistently for each reaction intermediate. The following mechanism was considered for water oxidation as previously suggested (Formula 5 hereinabove).

The corresponding free energies were calculated by subtracting the total energies of reactants and products (for example, $\Delta G_1$ is calculated for reaction 1). The reported zero point energy (ZPE) corrections and entropic contributions of pure $Fe_2O_3$ were added since the composition was shown to have a negligible effect on the results. (Liao, P.; Keith, J. A.; Carter, E. A., J. Am. Chem. Soc. 2012, 134, 13296-13309). The overpotential (O.P) is defined as the voltage needed to add to the calculated electrochemical potential of:

$$\frac{\sum_{i=1}^{5}\Delta G_i}{4e} = \frac{\Delta G_{(H_2O_{(l)} \to 2H_{2(g)}+O_{2(g)})}}{4e} = \frac{4.43[eV]}{4e} = 1.11[V], \quad (1)$$

in order to obtain the reaction potential $$\Phi_{rx} = \frac{\max\{\Delta G_i\}_{i=1}^{5}}{e} \quad (2)$$

in which all reaction steps free energies are negative, such that the reaction is thermodynamic spontaneous:

$$O.P = \Phi_{rx} - 1.11[V]. \quad (3)$$

Figure 7:
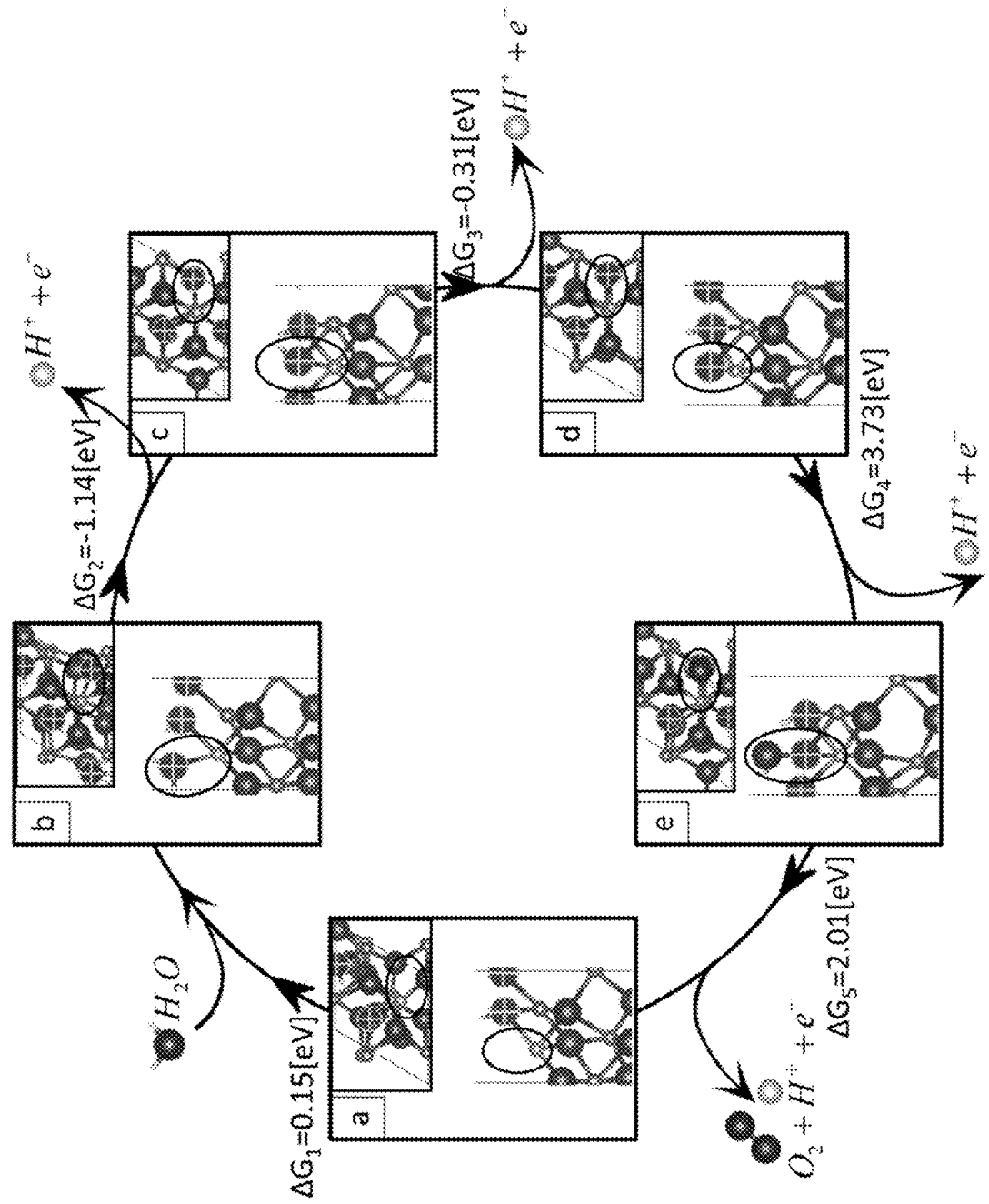
FIG. 7: Catalytic cycle of the water oxidation reaction on Nb-doped $Fe_2O_3$(0001). The insets show a top view of each reaction intermediate slab structure. The active site is circled in black. Created using VESTA visualizing software.

Calculating the free energies for Nb-doped $Fe_2O_3$ surface reveals that the first chemical bond breaking is favorable (as depicted in FIG. 7, $\Delta G_2 = -1.14$ eV). This first dehydrogenation is thermodynamically easy since reaction 2 involves extracting an electron from a surface that contains excess Nb-donated electrons. The negative free energy at the first dehydrogenation is compensated by a large free energy at later reaction steps. Subsequent reaction intermediates have less electron charge and therefore are more stable and have a corresponding larger free energy. As a result, the overpotential significantly increases upon Nb doping.

Thus, the amount of charge generated by the dopant at the surface affects the overpotential. Since Nb generates two electrons, the free energies involved in taking away these excess electrons are negative (FIG. 7, reaction 2 and 3). The number of electrons generated depends on the atom type, since the surface energetically prefers to remain neutrally charged, it also affects the overpotential.

Figure 8:
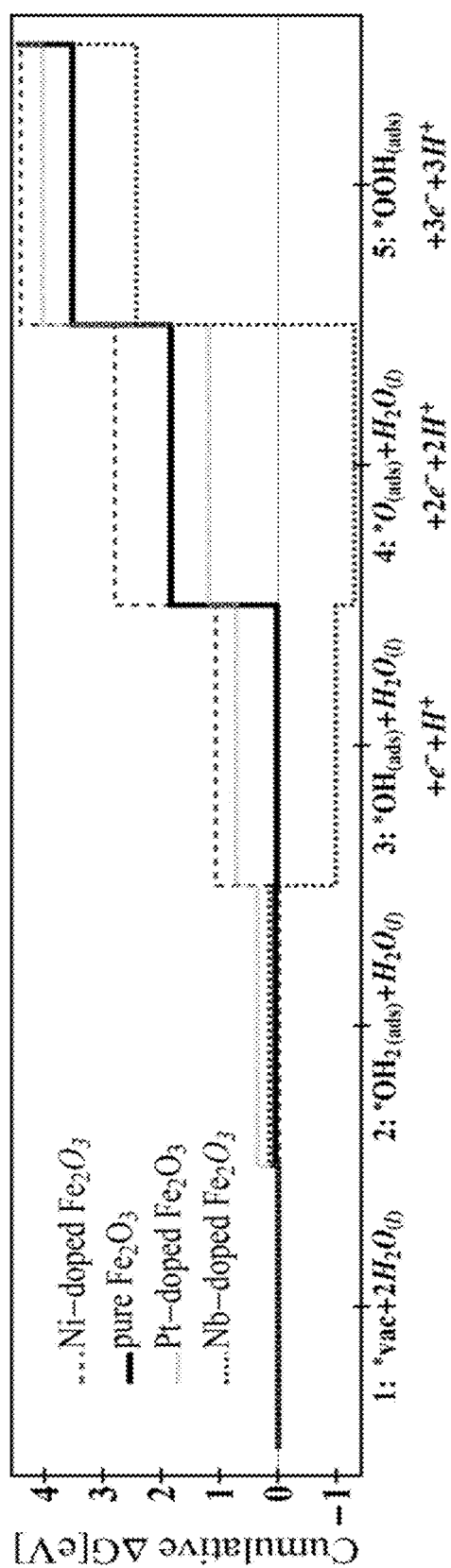
FIG. 8: Cumulative free energy for water oxidation on Ni-doped, pure, Pt-doped, Nb-doped $Fe_2O_3$. Values for non-Nb doped materials are obtained from: Liao, P.; Keith, J. A.; Carter, E. A., *Journal of the American Chemical Society* 2012, 134, 13296-13309.

The overpotential for water oxidation on $Fe_2O_3$ depends on the dopant atom type. The overpotential can be ranked according to the following relation: Nb>Pt>Fe>Ni, where Nb doping generates the highest overpotential, as depicted in Table 2 and FIG. 8. The high overpotential required to induce water oxidation in Nb-doped $Fe_2O_3$ results from the surface charging brought by the dopant. For example, in contrast to Nb doping, Ni does not donate excess electrons and the first dehydrogenation in Ni-doped $Fe_2O_3$ requires a positive free energy ($\Delta G_2=1.08$ eV). Free energy is required to extract a proton and an electron from the water-adsorbed surface that prefers to stay neutrally charges. The rest of the free energy needed to oxidize water is distributed over three dehydrogenation reactions (Table 2: reactions 2, 3, and 4). As a whole, doping $Fe_2O_3$ with Ni results in the best and lowest overpotenial.

TABLE 2

Free energies of intermediate water oxidation reactions for Ni-doped, pure, Pt-doped, and Nb-doped $Fe_2O_3$.

| | Reaction 1 | Reaction 2 | Reaction 3 | Reaction 4 | Reaction 5 | Overpotential |
|---|---|---|---|---|---|---|
| Ni-doped[12] | −0.01 | 1.08 | 1.73 | 1.61 | 0.03 | 0.62 |
| Pure[12] | 0.05 | −0.03 | 1.82 | 1.68 | 0.91 | 0.71 |
| Pt-doped[13] | 0.35 | 0.36 | 0.47 | 2.83 | 0.40 | 1.72 |
| Nb-doped | 0.15 | −1.14 | −0.31 | 3.73 | 2.01 | 2.62 |

*Units are in eV

Figure 9:
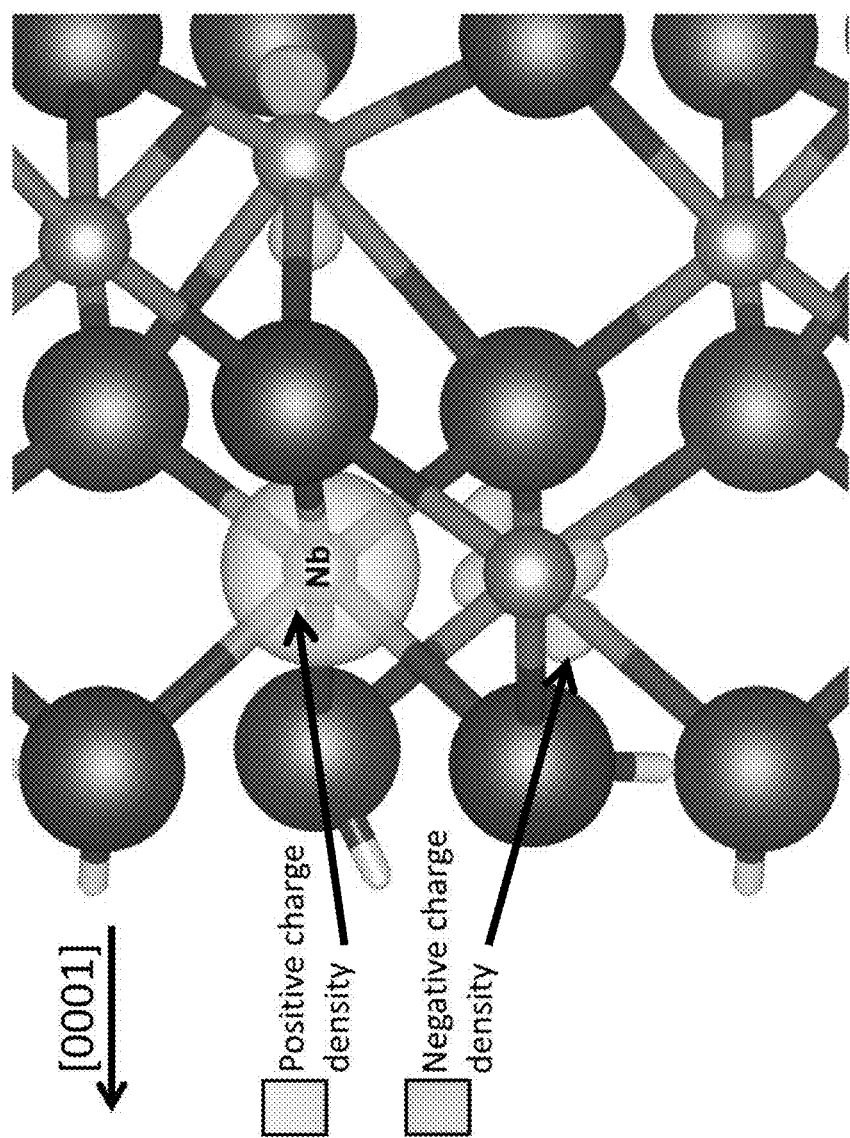
FIG. 9: Charge density difference plot for the *OH intermediate of Nb-doped vs. pure $Fe_2O_3$. Calculated by subtracting the electron density of the pure $Fe_2O_3$ from the Nb-doped $Fe_2O_3$*OH intermediate at the fixed ionic positions of the latter. Negative and positive charge density iso-surfaces (±0.07 [e/Bohr$^3$]), where negative being absence of electrons. Created using VESTA visualizing software.

As demonstrated, the charge of the dopant has a critical role. The Nb dopant is n-type in $Fe_2O_3$ and has a corresponding oxidation state of +5 (according to a Müllikan magnetic moment of zero). This can be visualized in FIG. 9, where Nb donates two electrons that are located on two iron atoms. Therefore, Nb donates twice more charge compared to the Pt dopant and has an oxidation state of +4. In contrast, previous calculations show that Ni is a p-type dopant and has an oxidation state of +2. Thus, the relation between the oxidation states is: $Nb^{+5}>Pt^{+4}>Fe^{+3}>Ni^{+2}$, where Nb charges the $Fe_2O_3$ surface the most.

Volcano curve can be used in order to correlate between the reaction potential $\Phi_{rx}$ and the surface binding energy of adsorbates (Liao, P.; Keith, J. A.; Carter, E. A., J. Am. Chem. Soc. 2012, 134, 13296-13309; Rossmeisl, J.; Qu, Z.-W.; Zhu, H.; Kroes, G.-J.; Nørskov, J. K., Journal of Electroanalytical Chemistry 2007, 607, 83-89; Valdes, A.; Qu, Z.-W.; Kroes, G.-J.; Rossmeisl, J.; Norskov, J. K., Journal of Physical Chemistry C 2008, 112, 9872-9879; Man, I. C. et. alChemCatChem 2011, 3, 1159-1165; Norskov, J. K. et. al. The Journal of Physical Chemistry B 2004, 108, 17886-17892).

Figure 10:
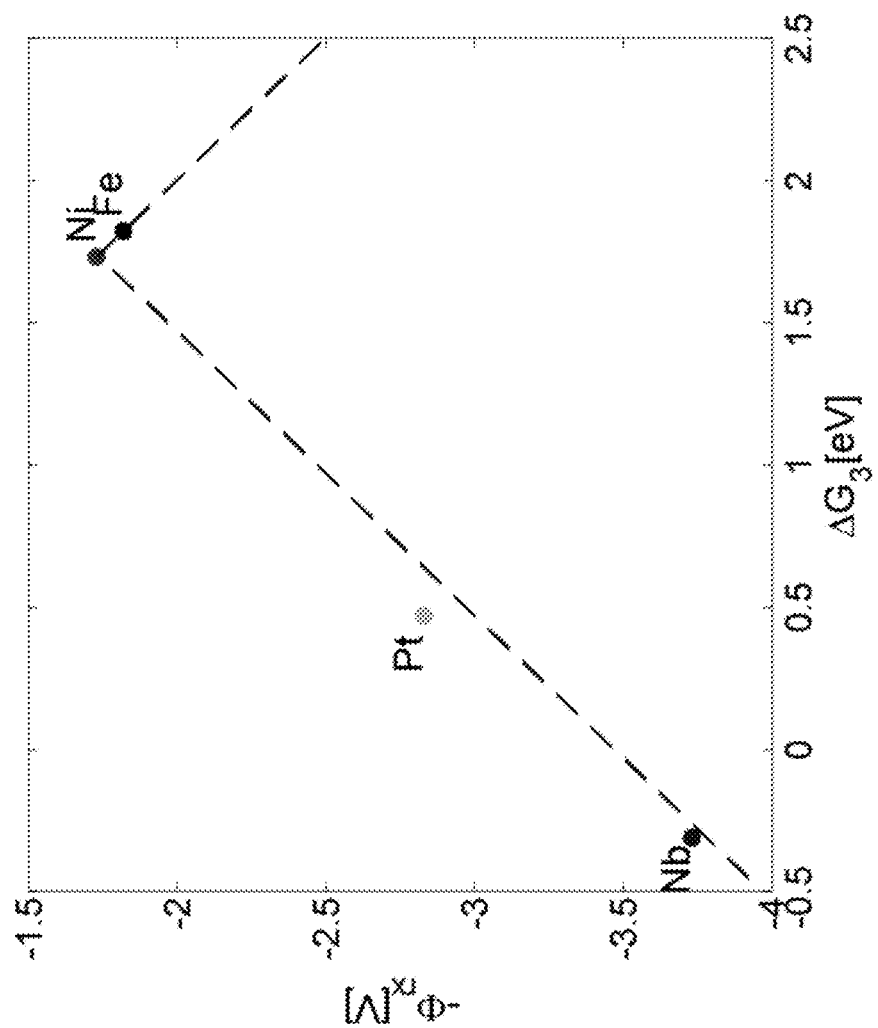
FIG. 10: Volcano plot for $Fe_2O_3$ demonstrating the location of Nb-doping at the far end of the curve.

The reaction potential $\Phi_{rx}$ for Nb is located on the Volcano curve that was previously obtained for other dopants of $Fe_2O_3$ (dashed line in FIG. 10), and therefore maintains the known scaling relationship between overpotential and reactants adsorption energies. Nb is positioned at the lower part of the curve with an outstandingly high reaction potential $\Phi_{rx}$ (FIG. 10) and overpontential (equation 3).

These results demonstrate that the overpotential of water oxidation on Nb-doped $Fe_2O_3(0001)$ is significantly higher than for pure $Fe_2O_3$ or for $Fe_2O_3$ doped with elements that have a smaller oxidation state than $Nb^{+5}$. This effect was explained by increasing the overpotential in terms of charging the surface: overcharging the surface at the beginning of the reaction via Nb-doping causes the first as well as the second dehydrogenation to be thermodynamically spontaneous, as depicted in Table 2, and reactions 2 and 3 which have a negative $\Delta G$ for the Nb-doped case. Overall, the free energies are not distributed evenly throughout the reaction intermediates and therefore the overpotential is extremely large.

Example 9

Photocatalytic Activity of the Non-Uniformly Doped Electrodes, Including Ti and Zn Dopants Different types of hematite electrodes were synthesized, which included one or more dopants, non-uniformly distributed along an axis perpendicular to the surface portion of the electrodes. The electrodes included undoped hematite film, Ti-doped or Zn-doped hematite films (30 nm), Zn-doped (12 nm) on undoped hematite films (18 nm), undoped (18 nm) on Ti-doped hematite films (12 nm), and Zn-doped (8.5 nm) on undoped (13 nm) on Ti-doped hematite films (8.5 nm). The overall hematite thickness in all the specimens was the same, 30 nm, so the amount of light they absorb is about the same. The doping level was 1% at. in all the doped electrodes. The photoanode structures were deposited on TEC15 substrates with $SnO_2$ underlayers (25 nm thick). The doping profiles of the electrodes are shown in FIGS. 11A-11F.

Photoanode Fabrication

Hematite films, as well oxide substrates such as $SnO_2$, were deposited by pulsed laser deposition (PLD) using a PVD Products PLD workstation. PLD works by focusing a high power pulsed excimer laser (KrF, $\lambda=248$ nm) beam on a target inside a vacuum chamber. In order to deposit hematite thin films with different dopants ceramic targets of undoped $Fe_2O_3$ and $Fe_2O_3$ doped with 1% at. Ti and 1% at. Zn were used. The targets were produced by solid state reaction route using high purity (99.9% or higher) powders of the base (binary) oxides: $Fe_2O_3$, $TiO_2$, and ZnO. Ti is an n-type dopant in hematite whereas Zn is a p-type dopant.

The photoanode fabrication was carried out by the following process scheme: the layers were deposited on a substrate starting with the bottom layer and ending with the top one (hematite). The depositions were carried out on fluorinated tin oxide (FTO) coated glass substrates (TEC15, Pilkington), borosilicate glass substrates (Eagle-XG, Corning), or platinized silicon wafers (Radiant Technologies).

Photoelectrochemical Measurements

Photoelectrochemical measurements, including cyclic voltammetry, were carried out in the dark and under solar-simulated illumination. The photoelectrochemical measurements were carried out in a dedicated photoelectrochemical testing system comprising a special photoelectrochemical cell (so-called the cappuccino cell), a solar simulator, and a potentiostat.

Figure 11G:
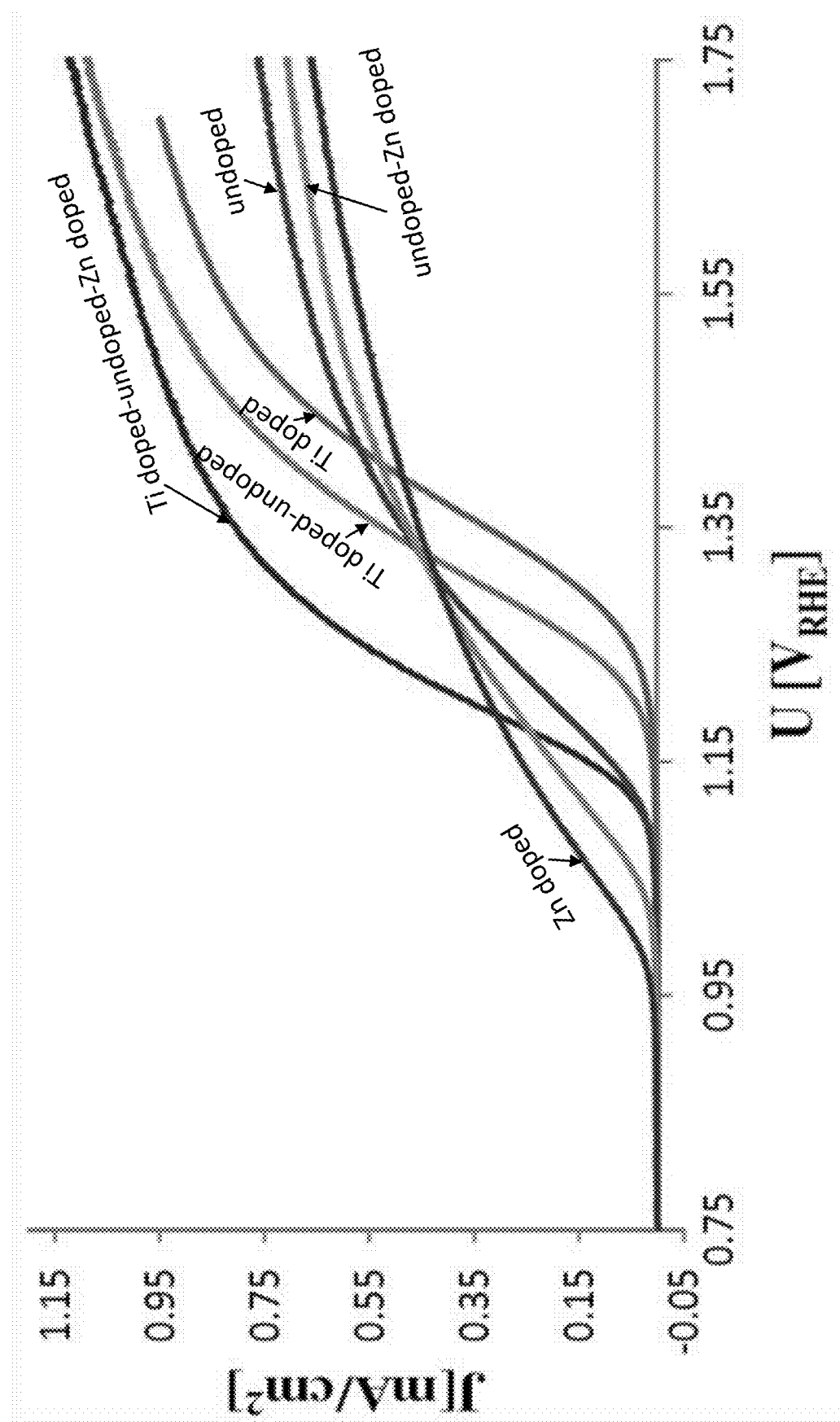
FIG. 11G: photocurrent vs. potential measured in alkaline solution (1M NaOH) using electrodes shown in FIGS. 11A-11F.

The photocurrents obtained with the tested photoanodes in alkaline solution (1M NaOH) are shown in FIG. 11G. In agreement with the theoretical calculations, the presence of the n-type dopant in the surface portion of hematite (Ti doped electrode) provided higher plateau photocurrent, but also increased the overpotential for the water oxidation reaction, as compared to the undoped electrode. The Ti-doped electrode, which did not include the n-type dopant in the surface portion (Ti doped-undoped electrode) showed higher photocurrent and lower overpotential than the uniformly Ti-doped electrode. Accordingly, the non-uniform doping was shown to provide improved photocatalytic activity as compared to a uniform doping, using the same type of the dopant.

The presence of the p-type dopant in the surface portion, while the bulk portion is undoped with an n-type dopant (undoped-Zn electrode) or doped with a p-type dopant (Zn-doped electrode), decreased the overpotential, but the photocurrent was low, as compared to the undoped electrode.

As predicted by the theoretical studies, both the higher photocurrent and the lower overpotential as compared to the undoped electrode and to the uniformly doped electrode were achieved with hematite electrodes, which were doped with an n-type dopant in the bulk portion and with a p-type dopant in the surface portion (Ti doped-undoped-Zn doped electrode).

Example 10

Photocatalytic Activity of the Non-Uniformly Doped Electrodes, Including Pt, Ni and Co Dopants Different types of hematite electrodes are synthesized, which include one or more dopants, non-uniformly distributed along an axis perpendicular to the surface portion of the electrodes. The electrodes include undoped hematite film, Pt-doped hematite film, undoped on Pt doped hematite film, Ni doped on Pt doped hematite film, and Co doped on Pt doped on Pt-doped hematite film. The photoanode structures are deposited on TEC15 substrates with $SnO_2$ underlayers.

Photoanode Fabrication

Hematite films are deposited by pulsed laser deposition (PLD) using a PVD Products PLD workstation. PLD works by focusing a high power pulsed excimer laser (KrF, $\lambda$=248 nm) beam on a target inside a vacuum chamber. In order to deposit hematite thin films with different dopants ceramic targets of undoped $Fe_2O_3$ and $Fe_2O_3$ doped with Pt, Ni and Co are used. The targets are produced by solid state reaction route using high purity (99.9% or higher) powders of the base (binary) oxides. Pt is an n-type dopant in hematite, whereas Ni and Co are p-type dopants.

Photoelectrochemical Measurements

Photoelectrochemical measurements, including cyclic voltammetry, are carried out in the dark and under solar-simulated illumination. The photoelectrochemical measurements are carried out in a dedicated photoelectrochemical testing system comprising a special photoelectrochemical cell (so-called the cappuccino cell), a solar simulator, and a potentiostat.

While certain embodiments of the invention have been illustrated and described, it will be clear that the invention is not limited to the embodiments described herein. Numerous modifications, changes, variations, substitutions and equivalents will be apparent to those skilled in the art without departing from the spirit and scope of the present invention as described by the claims, which follow.

The invention claimed is:

1. A photo-electrochemical (PEC) cell electrode being in a form of a thin film electrode having a bulk portion and a surface portion composed of the same catalytic material, wherein at least one of the bulk portion and the surface portion of the electrode is doped with at least one dopant, and wherein said doping is non-uniform along an axis perpendicular to the surface portion and a thickness of the electrode, wherein the electrode is configured to catalyze a single one of water splitting half-cell reactions and wherein the surface portion of the electrode is configured to contact an electrolyte of the PEC cell.

2. The electrode according to claim 1, wherein the catalytic material is selected from the group consisting of $\alpha$-$Fe_2O_3$, $TiO_2$, NiOOH, $NiO_2$, SrTiO, BaTiO, GaN, GaAs, MoS, WSe, MoSe, ZnO, $WO_3$, Si, $Cu_2O$, GaP, $GaInP_2$, CuGaSe, 3C—SiC, and $\alpha$-SiC.

3. The electrode according to claim 1, wherein the at least one dopant is selected from the group consisting of Pt, Ti, Zn, Nb, Ni, Co, Mn, Cu, Si, Sr, La, Al, Sn, Cr, Mo, Mg, Ta, and Fe.

4. The electrode according to claim 1, wherein the bulk portion and the surface portion are doped with the at least one dopant, and wherein the concentration of the at least one dopant in at least a fraction of the bulk portion is different than the concentration of the at least one dopant in the surface portion.

5. The electrode according to claim 4, wherein the difference in the concentration of the at least one dopant in at least a fraction of the bulk portion and in the surface portion is above about 50%.

6. The electrode according to claim 4, wherein the electrode material is an n-type material and the at least one dopant is an n-type dopant or wherein the electrode material is a p-type material and the at least one dopant is an p-type dopant; and wherein the concentration of the at least one dopant in at least a fraction of the bulk portion is higher than the concentration of the at least one dopant in the surface portion.

7. The electrode according to claim 6, wherein the concentration of the at least one dopant in at least a fraction of the bulk portion decreases in a gradient towards the surface portion.

8. The electrode according to claim 1, wherein the bulk portion is doped with the at least one dopant and the surface portion is not doped.

9. The electrode according to claim 8, wherein the electrode material is an n-type material and the at least one dopant is an n-type dopant or wherein the electrode material is a p-type material and the at least one dopant is a p-type dopant.

10. The electrode according to claim 8, wherein the concentration of the at least one dopant in the bulk portion decreases in a gradient towards the surface portion.

11. The electrode according to claim 1, wherein the surface portion is doped with the at least one dopant and the bulk portion is not doped.

12. The electrode according to claim 11, wherein the electrode material is an n-type material and the at least one dopant is a p-type dopant or wherein the electrode material is a p-type material and the at least one dopant is an n-type dopant.

13. The electrode according to claim 1, wherein at least a fraction of the bulk portion is doped with a first dopant and the surface portion is doped with a second dopant.

14. The electrode according to claim 13, wherein
the electrode material is an n-type material, the first dopant is an n-type dopant, and the second dopant is a p-type dopant; or the electrode material is a p-type material, the first dopant is a p-type dopant, and the second dopant is an n-type dopant.

15. The electrode according to claim 14, wherein the concentration of the first dopant decreases in a gradient towards the surface portion and the concentration of the second dopant decreases in a gradient towards the bulk portion.

16. The electrode according to claim 1, composed of α-$Fe_2O_3$, wherein the bulk portion is doped with Pt and the surface portion is not doped or doped with Ni or Co.

17. The electrode according to claim 1, composed of α-$Fe_2O_3$, wherein at least a fraction of the bulk portion is doped with Ti and the surface portion is doped with Zn.

18. The electrode according to claim 1, composed of α-$Fe_2O_3$, wherein the bulk portion is doped with Ti and the surface portion is not doped.

19. The electrode according to claim 1, wherein the electrode is selected from the group consisting of an anode, photoanode, cathode and photocathode.

20. A photo-electrochemical (PEC) cell comprising the electrode according to claim an electrolyte, and a substrate, wherein the surface portion of the electrode contacts the electrolyte and the bulk portion contacts the substrate.

* * * * *